(12) United States Patent
Hartmann

(10) Patent No.: US 6,203,707 B1
(45) Date of Patent: Mar. 20, 2001

(54) MEMBRANE MODULE FOR A MEMBRANE SEPARATION SYSTEM, ITS USE AND PROCESS FOR PRODUCING THE SAME

(75) Inventor: Eduard Hartmann, Schneisingen (CH)

(73) Assignee: Bucher-Guyer AG, Niederweningen/Zurich (CH)

( * ) Notice: Subject to any disclaimer, the term of this patent is extended or adjusted under 35 U.S.C. 154(b) by 0 days.

(21) Appl. No.: 09/101,325

(22) PCT Filed: Oct. 31, 1997

(86) PCT No.: PCT/CH97/00414

§ 371 Date: Jul. 7, 1998

§ 102(e) Date: Jul. 7, 1998

(87) PCT Pub. No.: WO98/19778

PCT Pub. Date: May 14, 1998

(30) Foreign Application Priority Data

Nov. 7, 1996 (CH) .................................................... 2746/96

(51) Int. Cl.[7] .................................................. B01D 63/10
(52) U.S. Cl. ............... 210/650; 210/321.83; 210/321.85; 210/321.89; 96/8
(58) Field of Search .................... 210/86, 94, 95, 210/104, 109, 110, 25.2, 321.6, 321.69, 321.74, 321, 79, 321.8, 321.83, 321.88, 321.89, 323.2, 339, 440, 443, 446, 497.1, 652, 65; 96/7–9; 426/495; 216/232, 321.76, 321.85, 651

(56) References Cited

U.S. PATENT DOCUMENTS 3,262,251 * 7/1966 Hicks .
3,289,846 * 12/1966 Warrington et al. ............ 210/321.74
3,294,504    12/1966 Hicks, Jr. ................................... 65/3
3,554,378 *  1/1971 Kohl .................................. 210/323.2
3,784,470 *  1/1974 Richardson et al. .
3,880,755 *  4/1975 Thomas et al. .................. 210/321.83
3,898,158 *  8/1975 Miller .............................. 210/321.83
3,963,622 *  6/1976 Baudet et al. ................... 210/321.79
4,036,760    7/1977 Bardonnet et al. ............... 210/323.2
4,242,459 * 12/1980 Chick et al. ..................... 210/321.83
4,414,113 * 11/1983 Laterra ............................ 210/321.69
4,789,480 * 12/1988 Bruschke ......................... 210/321.85
4,925,555 *  5/1990 Spielberg ......................... 210/321.83
5,202,023    4/1993 Trimmer et al. .................. 210/321.8

FOREIGN PATENT DOCUMENTS

97/05946  2/1997  (WO) .
97/30779  8/1997  (WO) .

* cited by examiner

Primary Examiner—Joseph W. Drodge
(74) Attorney, Agent, or Firm—Burns, Doane, Swecker & Mathis

(57) ABSTRACT

The membrane module includes tube membranes (6), which are arranged in the membrane module in coiled, curved form (8). As a result, a greater total membrane surface area per unit of volume, simplified assembly, and processing of material mixtures with a high solid proportion are all attained. The modules are arranged to facilitate cross flow filtration over membrane surfaces disposed between a supply conduit manifold and a discharge conduit manifold. Optionally, the coils are aligned in parallel and are in coaxial relation to each other.

74 Claims, 21 Drawing Sheets

D-D

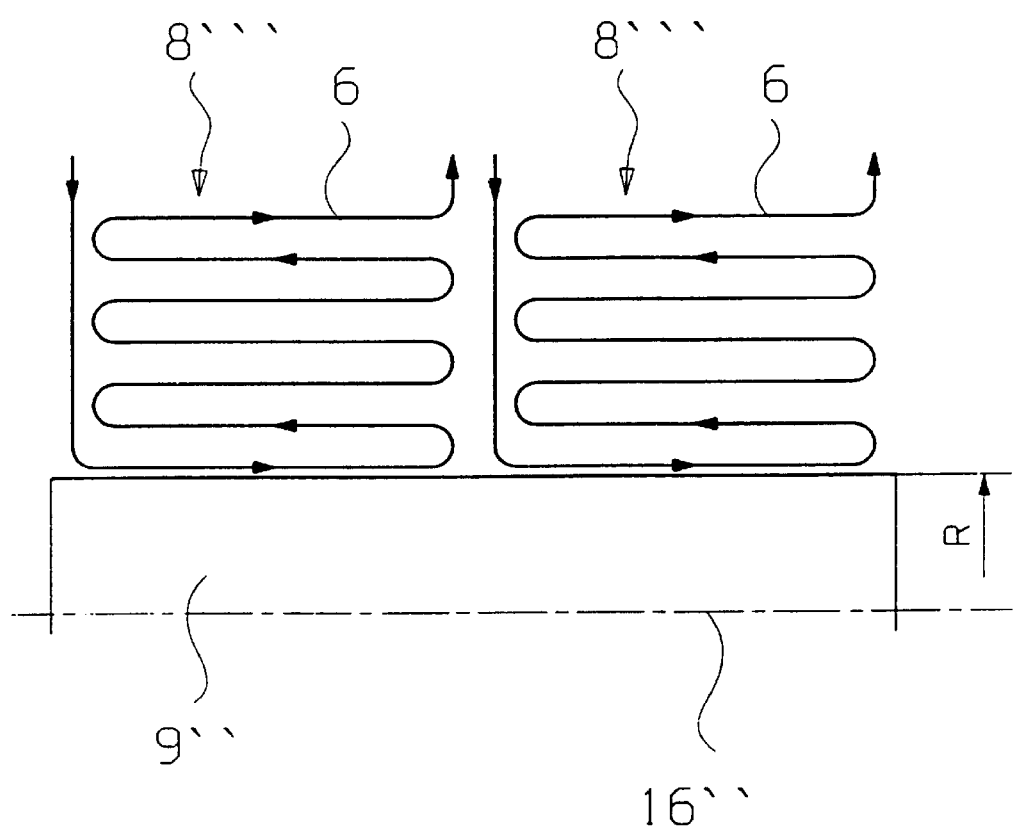

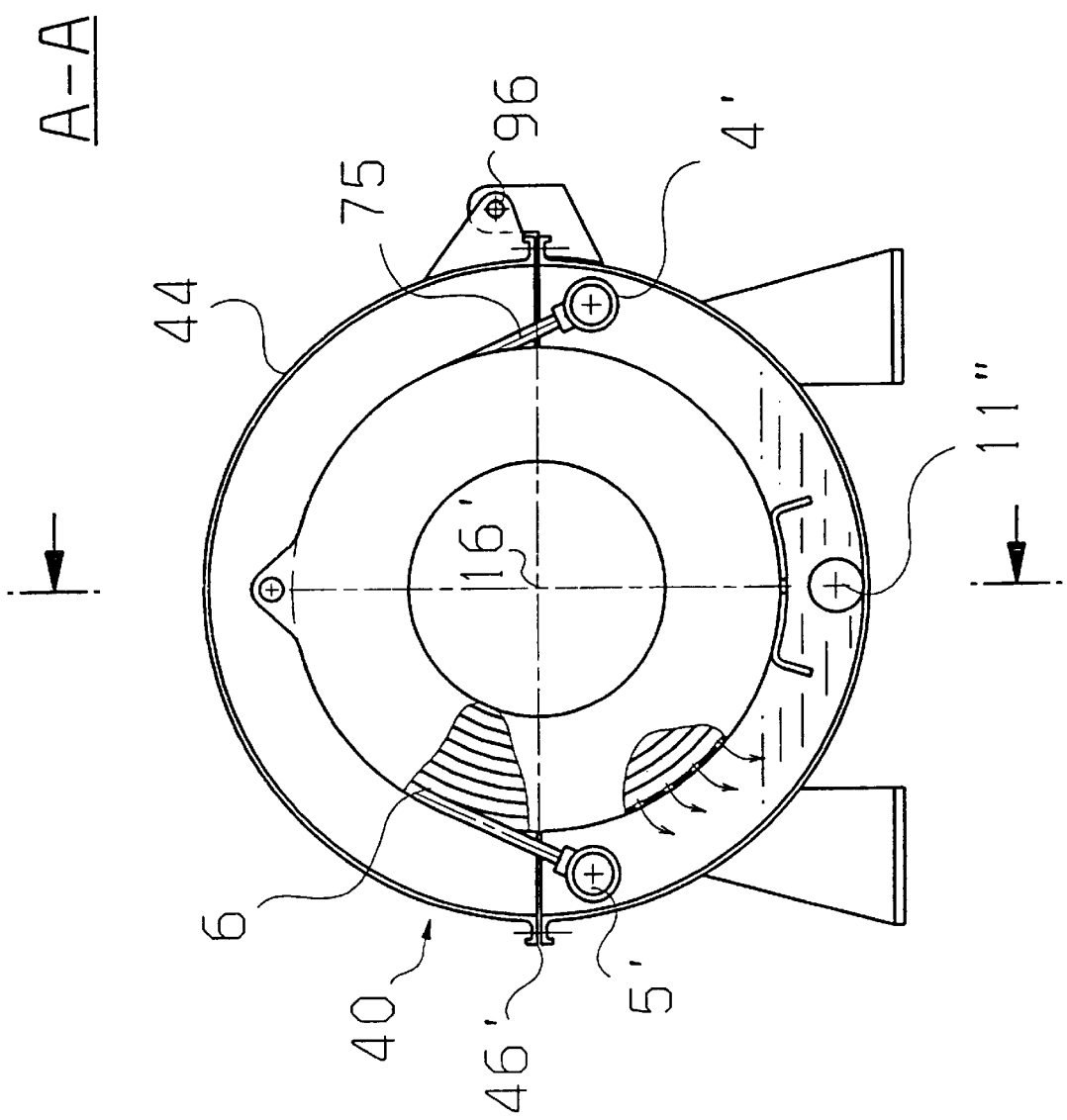

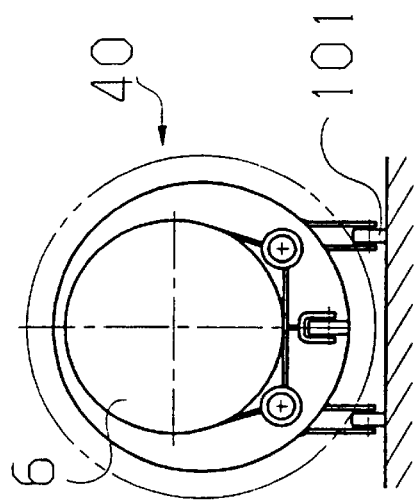
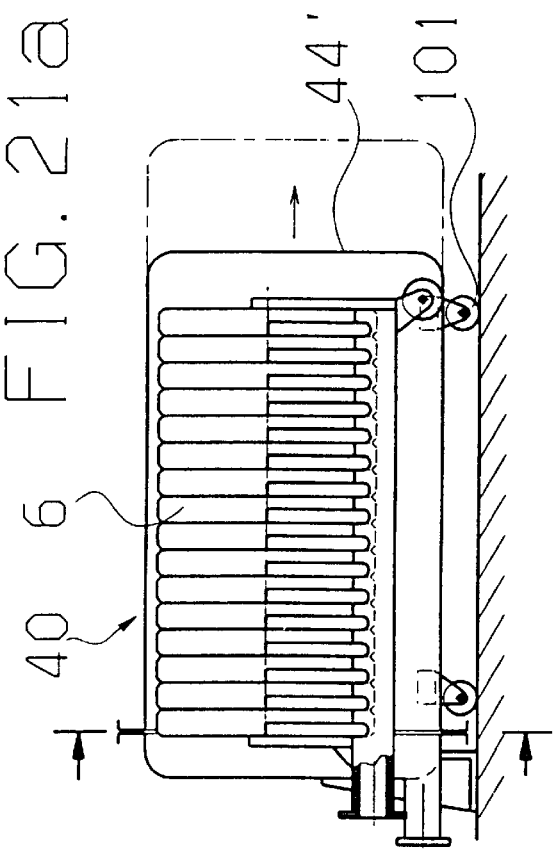
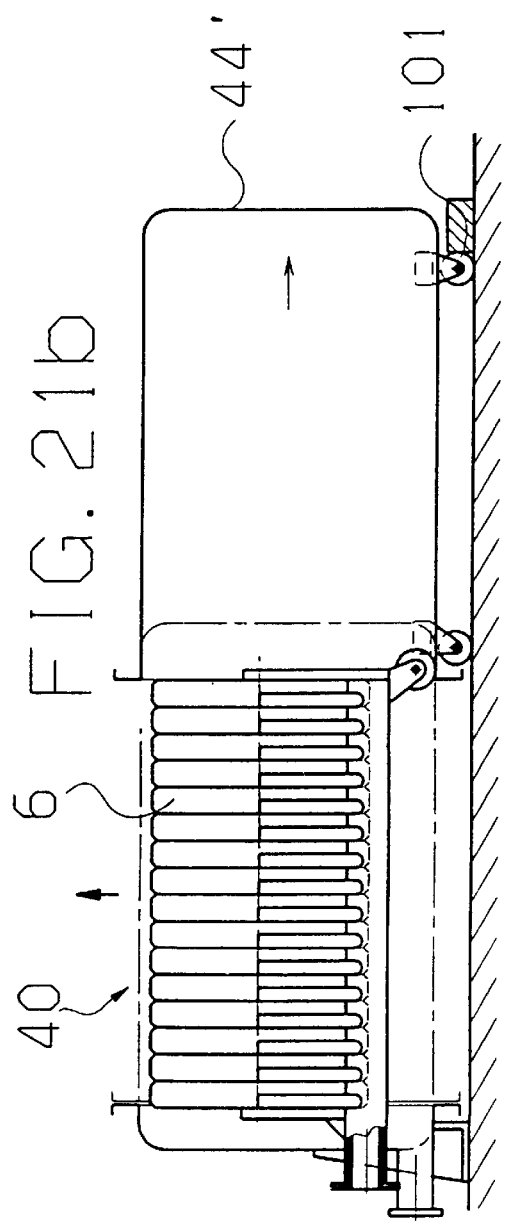

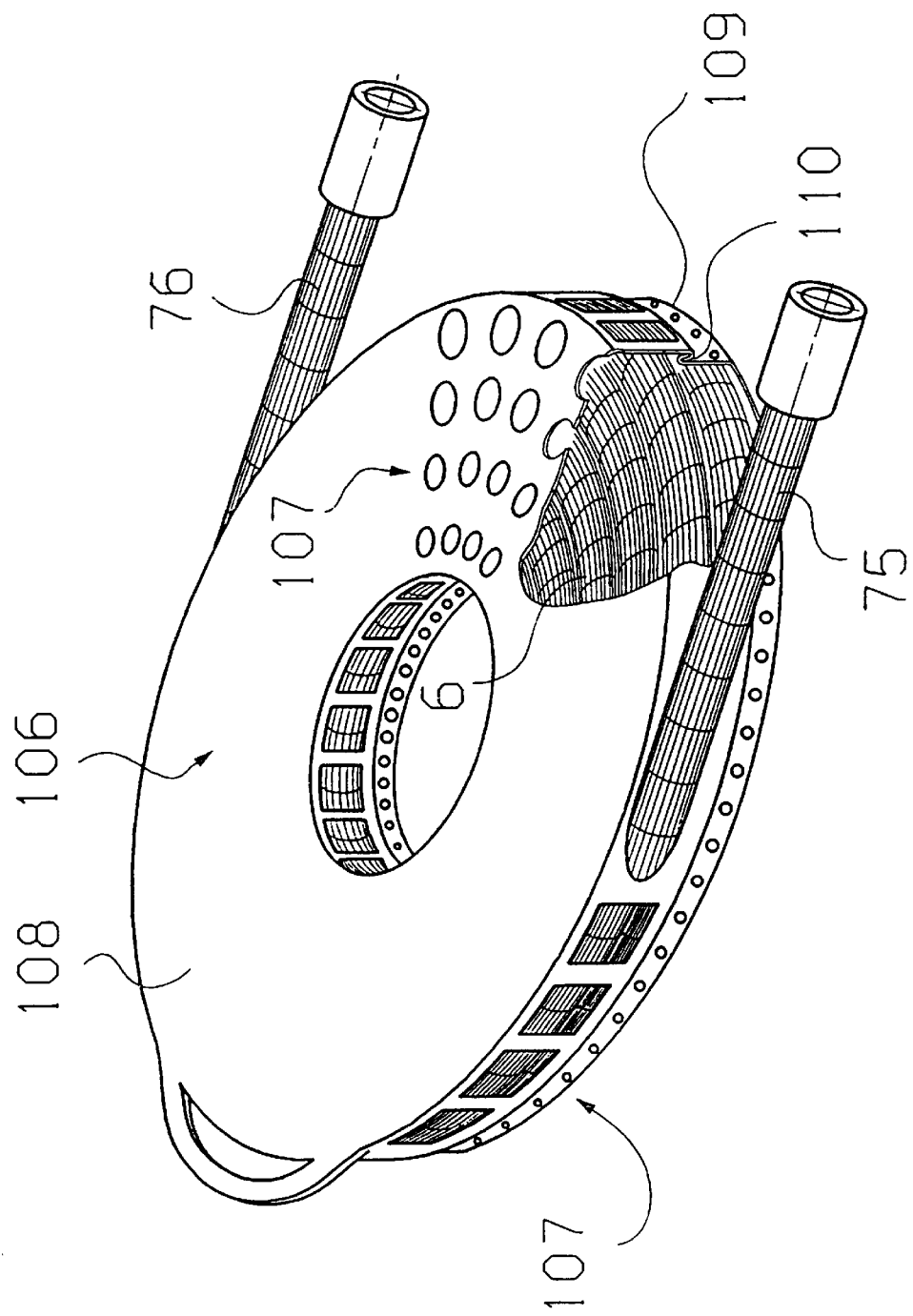

MEMBRANE MODULE FOR A MEMBRANE SEPARATION SYSTEM, ITS USE AND PROCESS FOR PRODUCING THE SAME

This application is a 371 of Application PCT/CH97/00414, filed on Oct. 31, 1997.

BACKGROUND OF THE INVENTION

The invention relates to a membrane module of an installation for membrane separation of material mixtures comprising one or more tube membranes, a process for their manufacture by extrusion of synthetic material as well as applications of the membrane module.

Such membrane modules are known as structural elements in cross current filtration plants. They comprise mostly a plurality of tube membranes acting as filters. The tube membranes are designed as porous tubes either themselves designed as membrane filters or carrying filtration membranes of organic or inorganic materials on their surface. Tube membranes comprising interior or exterior membranes, are known. Their inside diameters range from some decimillimeters to about 100 millimeters.

In order to attain acceptable construction lengths of the membrane modules, combined with a useful filtration output, a small or larger number of straight tube membranes are installed in a straight jacket tube. This module tube has a combined entry and exit for all tube membranes for the medium to be filtered as a retentate and one or two exits for a filtrate as a permeate.

Membrane modules designed as so-called coil modules are also known. In this context cloth-like filter membranes are wound into an elongate roll in which the flow-through of the retentate and the drainage of the permeate is made possible by co-wound thin elastic spacers or nets. Coil modules of this design are very reasonably priced having regard to their filtration performance. However, because of their tendency to clog they are unsuitable for the separation of material mixtures having a high solids content. In contrast to this, with tube membranes having an inside diameter of some millimeters (a plurality of millimeters) even material mixtures having a high solids content such as pressed fruit juices, for example, can be processed without risk of clogging.

As the specific filtration output, in relation to the surface area, of known tube membranes of polysulphone or PDVF is relatively low, a number of modules, each comprising e.g. 19 tube membranes of 3 m length each, are interconnected in one installation in series and also in parallel in order to attain higher, economically acceptable filtration outputs.

If the number of the modules connected in series is high, up to 16 modules per series are known, the latter are interconnected by way of 180 degree pipe bends. If the group comprises as few as 5 series or passes switched simultaneously in parallel, 80 modules have to be provided in as compact a single unit as possible in order to attain a membrane filter surface area of about 180 m². The individual modules are for this purpose mounted on support arms on racks and the numerous connections on the retentate side and the permeate side are brought about. This entails the following problems:

4 tube connections and two to three supports on support arms are required per membrane module. In an installation having 80 modules, these connections and supports result in 80 connecting bends, 85 hose connections and 320 connecting points, they further result in high installation costs thus reducing the cost efficiency of the plant.

Separating membranes have only a limited useful life. The membrane modules are thus parts subjected to wear and tear, having to be replaced at certain time intervals.

The efforts for assembly and disassembly as well as for the complex construction are thus enormous for this design.

SUMMARY OF THE INVENTION

It is therefore the object of the invention to eliminate the stated problems to a large extent.

According to the invention this object is attained by a membrane module of the type as set out in the opening paragraph in that the tube membranes are provided in the membrane module in a curved configuration. An advantageous modification of this membrane module is characterized in that the tube membranes are provided in the membrane module in a coiled configuration.

This may lead to the feature that the tube membranes in the form of at least one bundle of a plurality of tube membranes are coiled in the membrane module in rope-like twisted form (lay).

Further modifications of the membrane module, a process for the manufacture of tube membranes suited therefor by way of extrusion of synthetic resin as well as the use of the membrane module, are set out in the patent claims.

It has been found that a lay-out according to the invention may be attained with conventional tube membranes which can be bent at bending radii less than 20 times the inner diameter of the tube without damaging the membrane layer. For this purpose tube membranes of organic materials in the required lengths are commercially available. Known tube membranes of an inorganic material, such as sintered metal, can be produced in the required lengths from commercially available tube pieces of up to 1 m length by bending, welding together and application of the membrane by coating.

Compared with conventional membrane modules, membrane modules according to the invention offer the advantage of a high packing density and a simpler design. Compared with the abovementioned group of 80 conventional membrane modules, such a group may be replaced by a membrane module according to the invention having an outer diameter of about 1.40 m and a structural height of 1.40 m having the same membrane filter surface area of about 180 m². Instead of the aforesaid 320 connections only about 3 connections will still be necessary, depending on the design. For this purpose, the membrane filter surface in the membrane module is formed by 150 parallel membrane tubes having an inner diameter of about 7 mm and a length of 55 m each.

BRIEF DESCRIPTION OF THE DRAWINGS

Embodiments of the invention are elucidated in more detail in the specification which follows and in the figures of the drawing. There are shown in.

DETAILED DESCRIPTION OF THE INVENTION

Figure 1A:
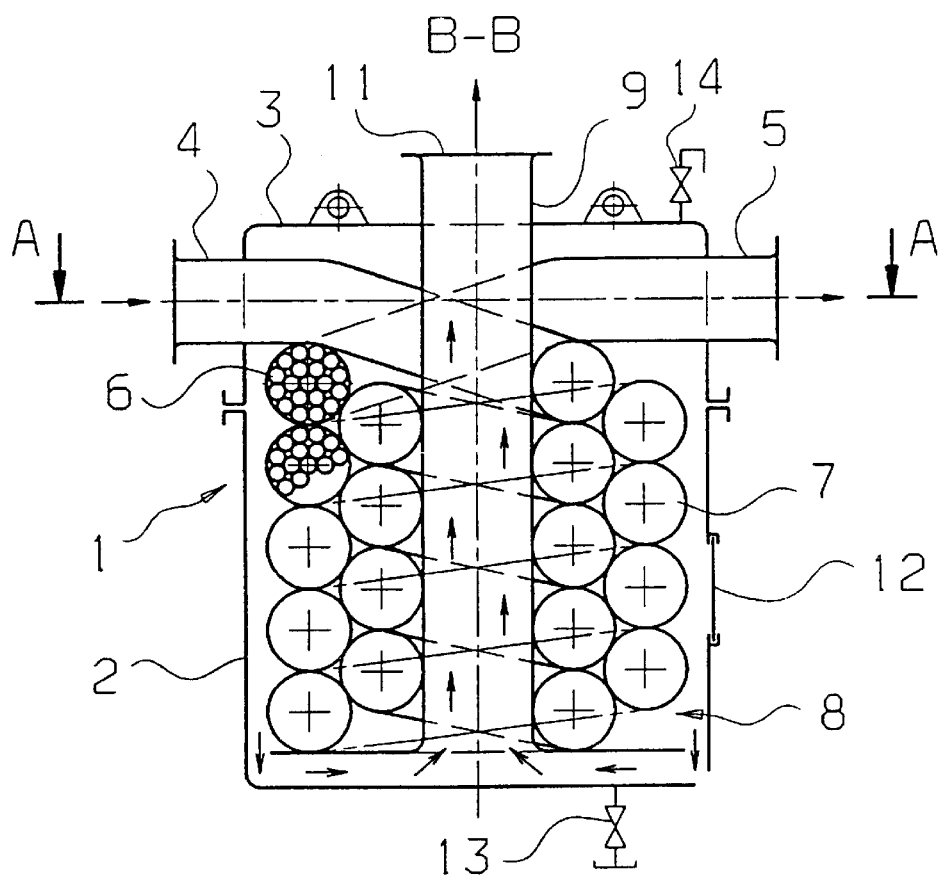
FIG. 1a a membrane module according to the invention for the membrane separation in a vertical section B—B according to FIG. 1b, FIG. 1b a horizontal section A—A of the membrane module according to FIG. 1a, FIG. 2a a partial section C—C according to FIG. 2b of a collecting pipe for tube membranes at the beginning or at the end of a winding, FIG. 2b an end facing view of the collecting pipe for tube membranes according to FIG. 2a, FIG. 3 a modification of a membrane module according to the invention for the membrane separation in a vertical section, FIG. 4a a further membrane module according to the invention for the membrane separation in a vertical section, in combination with a permeate tank, FIG. 4b a horizontal partial section D—D according to FIG. 4a across a collecting pipe for tube membranes at the beginning or at the end of a winding, FIG. 5 a cross-section through a bundle of a plurality of tube membranes of a winding in a membrane module according to FIG. 1a comprising spacers between the tube membranes, FIG. 6 a section across spacer elements molded onto a tube membrane, FIG. 7 a view of a modification of spacer elements molded onto a tube membrane, FIG. 8 a view of a wire-like spacer element, wound around a tube membrane, FIG. 9 a view of three tube membranes for coiling into a form produced as a longitudinally contiguous unit, FIG. 10a a radial section across two disk-like flat tube membrane modules each containing a single continuous tube membrane, FIG. 10b a winding pattern for flat winding compromising two layers to form a membrane tubing unit into two coils according to FIG. 10a, FIG. 11 an axial partial section across a membrane module comprising a horizontal winding axis for the tube membranes, FIG. 12 a winding pattern for two windings of tube membranes disposed side by side in a membrane module, and FIG. 13 a view of a tube membrane produced as a flat tube for conversion into a coiled body, FIG. 14 a membrane module according to the invention for membrane separation, having a vessel as a tank for the material that has been separated, FIG. 15 a diagram of a system for membrane separation of material mixtures, having a membrane module of FIG. 14, FIG. 16 a membrane module according to the invention, in which a plurality of tube modules are disposed with their winding axes vertically one above the other, FIGS. 17a, 17b two views of a membrane module in which a plurality of tube membranes are disposed interchangeably between support plates in drawerlike compartments, FIG. 18 a membrane module having a plurality of tube membranes, which can be disposed vertically and horizontally with a tipping device, FIG. 19 a membrane module according to the invention, in which a plurality of tube modules are disposed with their winding axes horizontally side by side, in a side view, FIG. 20 the membrane module of FIG. 19 in an axial view, FIGS. 21a, 21b, 21c a membrane module according to the invention, having a plurality of tube membranes, with a retractable vessel, in various views, FIG. 22 a disklike flat winding or tube membrane module comprising only a single continuous membrane tubing unit in a boxlike container for retaining and replacing the winding, FIG. 23a a disklike flat winding comprising only a single continuous tube membrane, with a support plate to improve stability, FIGS. 23b, 23c two variants of support plates of FIG. 23a, FIG. 24 a diagram of a two-layered disklike flat winding comprising two continuous tube membranes to increase the diameter and the filter area of the winding, FIG. 25 a circuit diagram of three groups, each comprising three tube modules, with collecting pipes between the groups that act as mixing chambers, FIGS. 26a, 26b, 26c details of a fast-action closure connection of a tube membrane with a collecting pipe as in FIG. 17, FIG. 27 an embodiment of a connection of a coiled bundle of tube membranes with a collecting pipe as in FIG. 2a, in which a plurality of tube membranes of equal length are arranged such that their ends are staggered, FIG. 28 an interruption, embodied as a mixing chamber, in a coiled bundle of tube membranes in a membrane module of FIG. 1a, in an arrangement of tube membranes of equal length in partial bundles, with the ends of the tube membranes staggered.
Figure 1B:
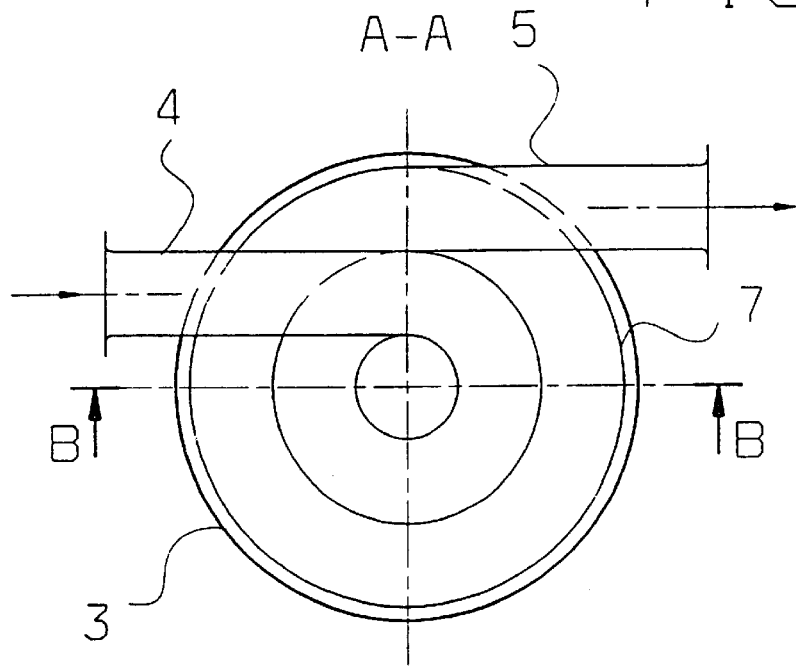

FIG. 1a and FIG. 1b each illustrate a section of a membrane module in which tube membranes are wound around a vertical winding axis. The membrane module comprises a closed vessel 1 comprising a lower portion 2 and an upper portion 3 fitted to the latter in sealing relationship but removably. As is apparent in particular from FIG. 1a, two collecting pipes 4, 5 for a plurality of tube membranes are introduced laterally into the upper portion 3. As can be seen, a portion of each collecting pipe 4, 5 is inside the closed vessel 1. The tube membranes 6 form a continuous bundle 7 connecting the collecting pipes 4 and 5, wound around a vertical winding core 9 serving as a support in a coiled body 8 or a coil.

Figure 2B:
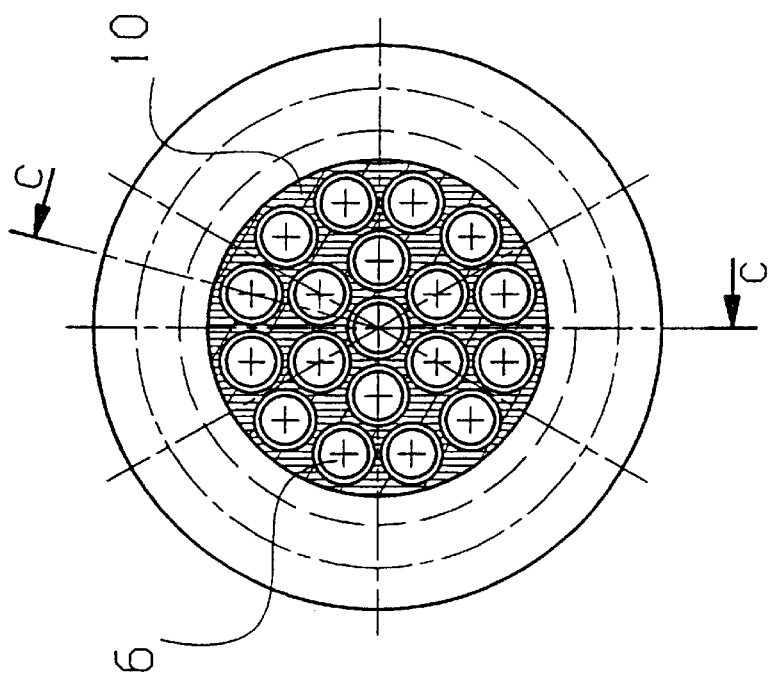
Figure 2A:
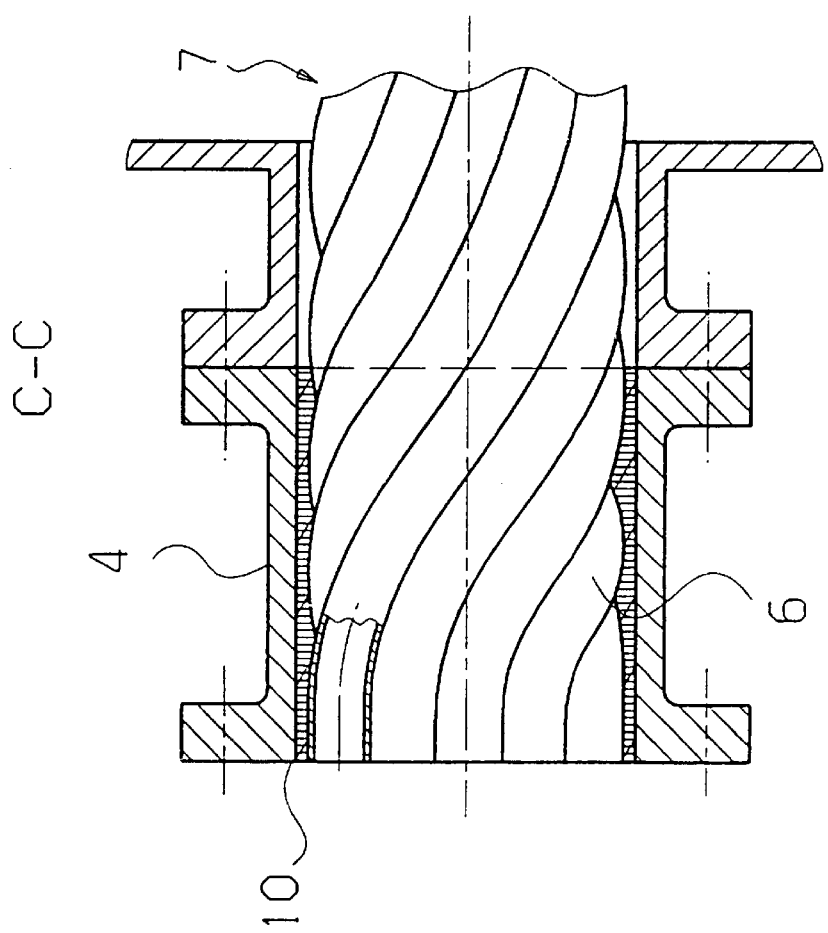

FIGS. 2a and 2b illustrate an end of a collecting pipe 4 or 5 in a partial section and in an axial view. As is apparent from FIG. 2a, the plurality of tube membranes 6 in the bundle 7 is wound in rope-like twisted configuration with a so-called lay. This serves the purpose of permitting the bent guidance of the bundle 7 in the coil 8 without damaging the tube membranes 6. The tube membranes 6 are fixed to the end of the collecting pipe 4 by casting with a casting compound 10.

The material mixture to be separated, e.g. a pressed fruit juice, is fed under pressure to one of the collecting pipes 4, 5 where it flows parallel against the plurality of tube membranes 6. At the corresponding other collecting pipe 5 or 4 the material mixture is discharged again as retentate. On the way through the tube membranes 6 a portion of the material mixture of correspondingly fine particle size is separated in a manner known per se through the membranes, reaching in this manner the free space of the vessel 1, encompassing the configuration 8 according to FIG. 1a, as a permeate or filtrate.

From this space the permeate reaches an outlet 11 for the separated material through the winding core 9 serving simultaneously as collecting pipe. As illustrated in FIG. 1a, the winding core 9 is disc shaped in its lower region for supporting the coiled body 8. In order to keep the separating membranes of the tube membranes 6 wetted at all times, the outlet 11 is provided at the top. The entire coiled body 8 of the bundle 7 is removable for controlling purposes with the collecting pipes 4, 5 and 9 from the lower portion 2 of the vessel 1. Likewise for control purposes, a viewing glass 12 is provided in the lower portion 2. For draining the permeate, the vessel comprises a sealable outlet 13 below while an air outlet 14 is provided at the top.

Figure 3:
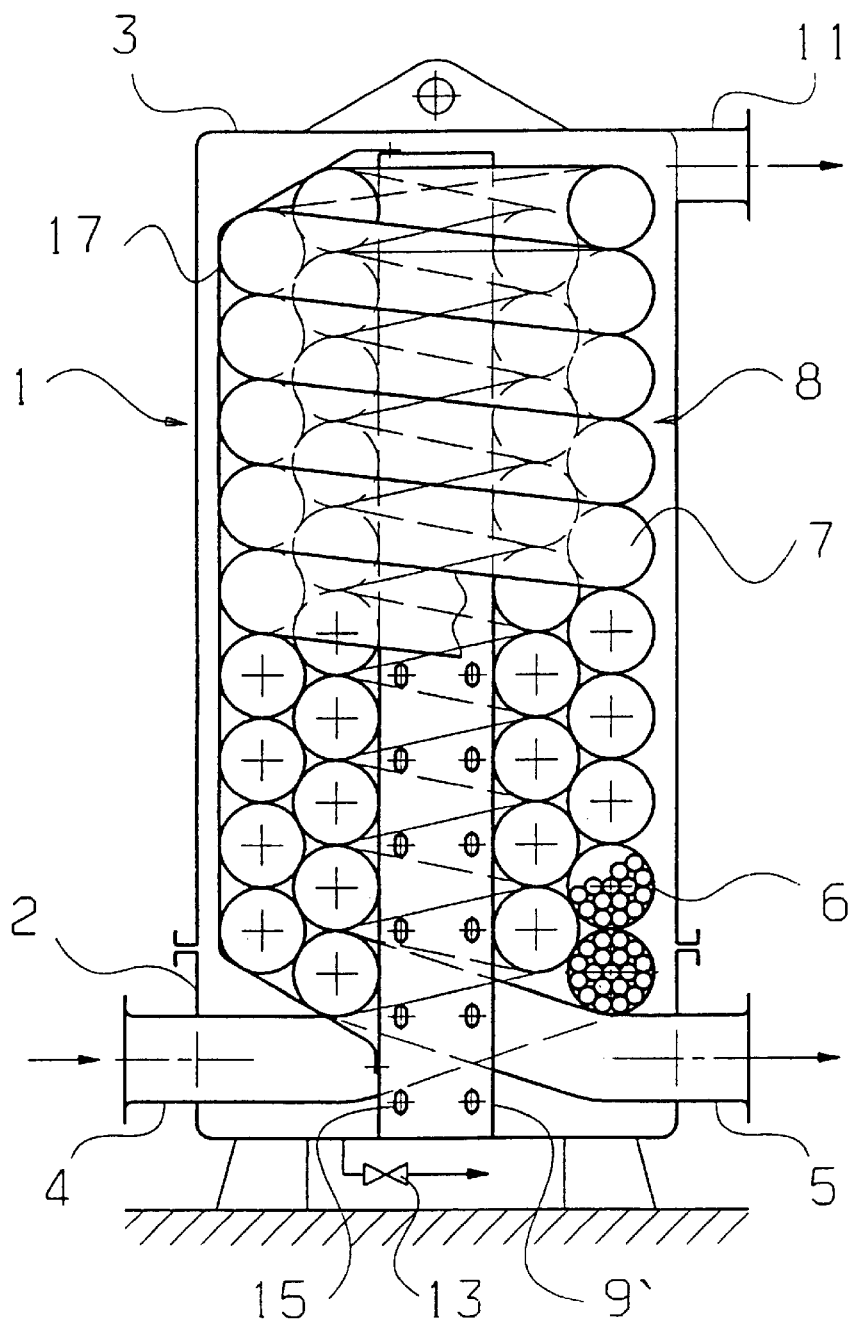

In a modification of the membrane module according to FIG. 3 reference numerals already explained with regard to FIG. 1 a refer to structural elements having a corresponding function. The collecting pipes 4, 5, serving as connections for the retentate, are in this case provided in the lower portion 2 of the vessel 1 while an outlet 11 is provided for the permeate at the top of the upper portion 3. For operations on the coiled body 8 only one permeate duct towards the outlet 11 needs be disassembled in this case with the upper portion 3. The coiled body 8 is stabilized by a holding strap 17. The winding core 9' is provided with apertures 15 for collecting the permeate.

Figure 4A:
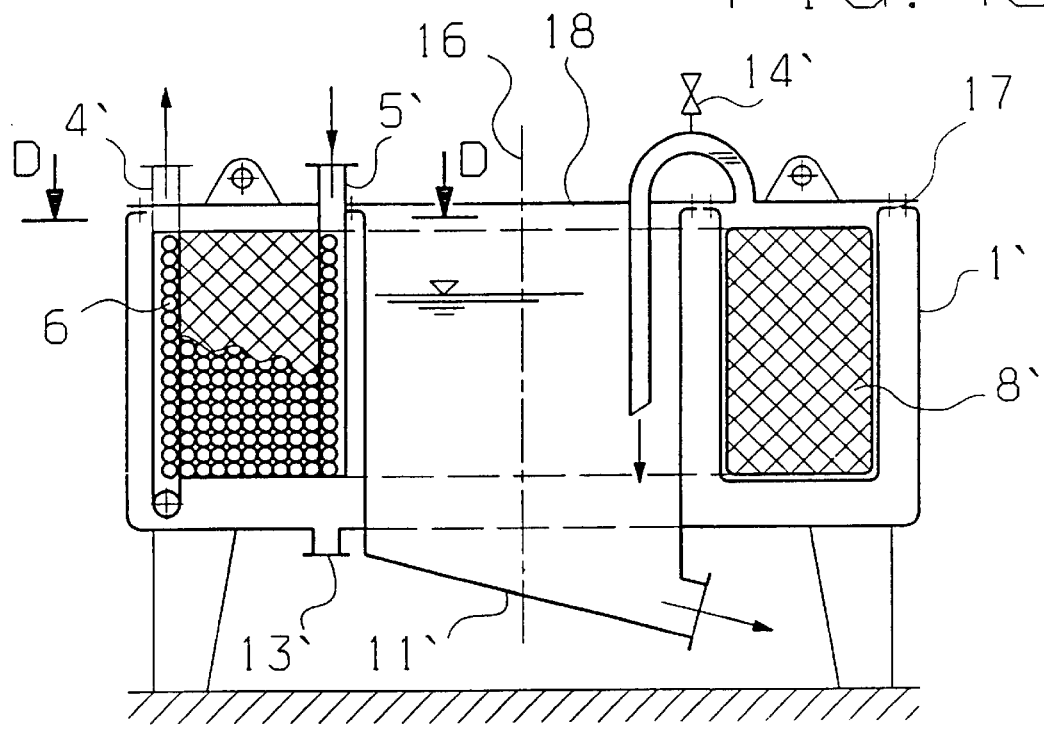

FIG. 4a shows another modification of the membrane module. In this case a closed vessel 1' is designed as a permeate tank. In the vessel 1' a plurality of tube membranes 6, positioned in a row side by side and parallel to one another, is wound around an axis 16. These tube membranes 6 terminate in this case transversely to the axial direction into collecting pipes 4' and 5' for the material mixture to be separated where, similiarly to the embodiments according to FIGS. 1a and 3, they receive the flow in parallel. This requires no twisting of the tube membranes 6, and as a result a high packing density of the filtering surface is attained in the space available. The collecting pipes 4', 5' for the retentate may furthermore be kept small in diameter as the tube membranes 6 terminate transversely, as shown in particular in the section D—D according to FIG. 4b.

Figure 4B:
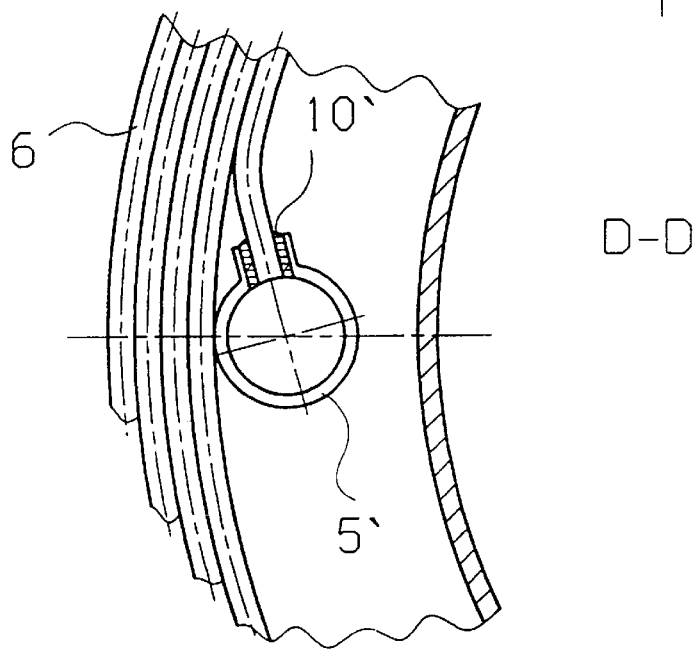

The tube membranes 6 are cast into the collecting pipes 5' by means of a casting compound 10', as shown in FIG. 4b. From the tube membranes 6 the permeate reaches the vessel 1' which in this case likewise has the function of an integrated permeate tank 18. A permeate outlet 11' is provided below on the vessel 1'. The coiled body 8' is stabilized by holding straps 17, as is apparent from FIG. 4a.

Figure 5:
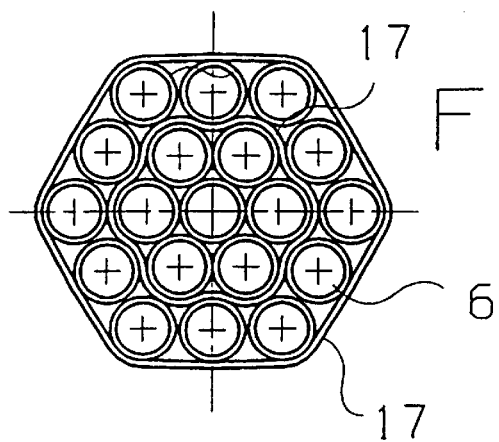

FIG. 5 in an axial view corresponding to that of FIG. 2b, illustrates a bundle of tube membranes 6, the position of the tube membranes 6 being stabilized by holding straps 17. As can be seen, the holding straps 17 simultaneously serve as spacers between the tube membranes 6. An improved drainage of the permeate exiting from the tube membranes 6 is made possible in that the holding straps 17 are net-like.

Figure 6:
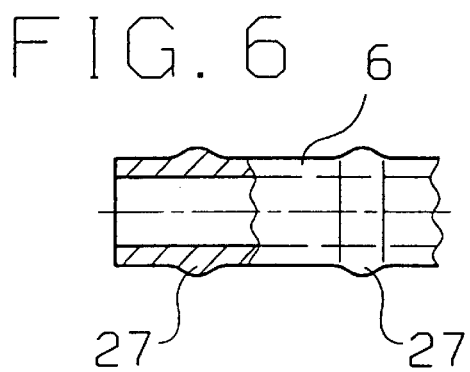
Figure 7:
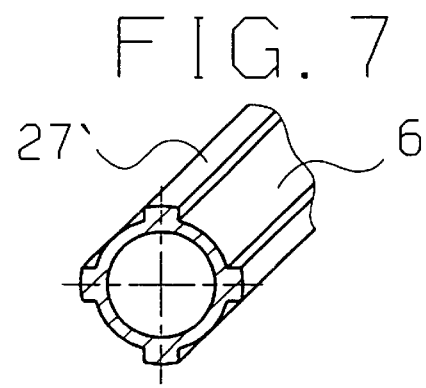
Figure 8:
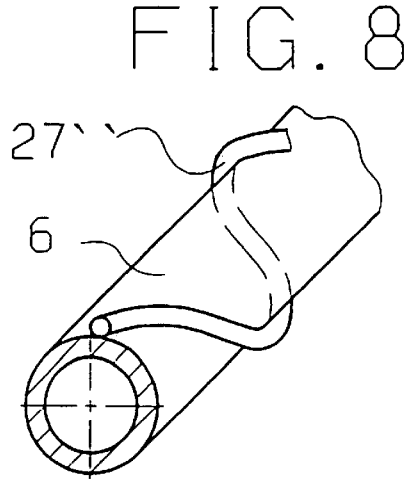

A further possibility to bring about a suitable spacing between the tube membranes 6 in a coiled body is shown in FIG. 6 in that the tube membrane 6 comprises spacer elements 27 molded on as peripheral bulges. An embodiment of such spacer elements 27' extending in an axial direction on the outside of a tube membrane, is shown in FIG. 7. According to FIG. 8 such spacer elements 27" may also be wound in wire-like form helically around a tube membrane 6.

Figure 10A:
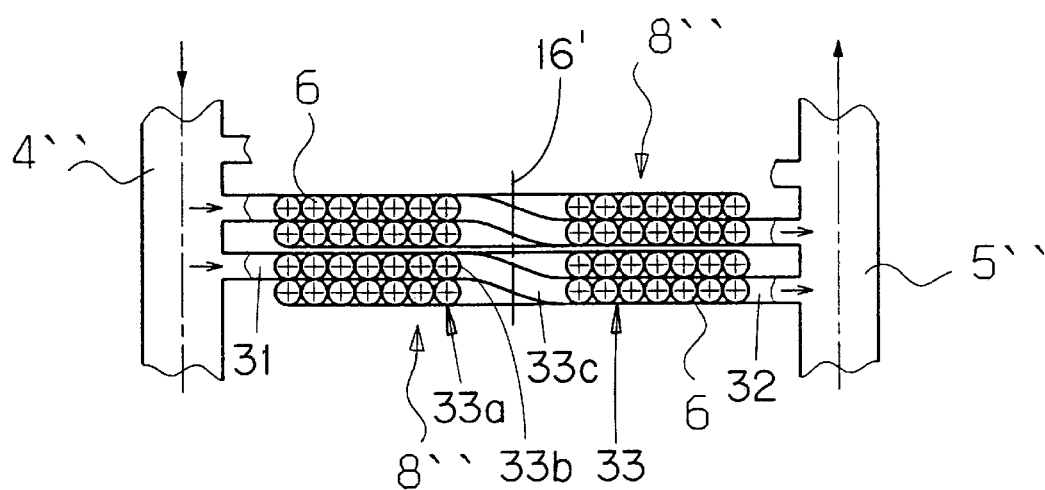
Figure 10B:
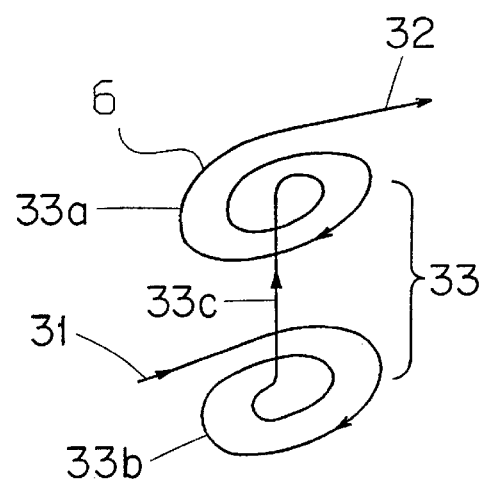

FIG. 10a shows a cross flow filtration apparatus that includes two spirally coiled bodies 8" of tube membranes 6 having only two layers and thus having a disk-like configuration. The bodies 8" are connected on both sides to collecting pipes or manifolds 4", 5" for the retentate, adapted to accommodate still further bodies, not shown, of the same type. The permeate may be collected in known manner from the surroundings of the coiled bodies 8". FIG. 10b illustrates a winding pattern of a tube membrane 6 for a tube membrane module or body 8". The membrane tubing unit making up a tube membrane module 8" has first and second end portions 31 and 32 and a central portion 33. The central portion 33 is wound about an axis 16' in two side-by-side co-axial coils 33a and 33b joined together on the inner periphery of the coils by a connector portion 33c. The end portions 31 and 32 extend outwardly from the peripheries of their respective coils 33b and 33a in opposite circumferential directions for efficient connection to the manifolds 4" and 5" for supplying and discharging the mixture which is being separated. In contrast to the embodiments of the filtration modules according to FIGS. 1a, 3 and 4a, the embodiment according to FIG. 10a permits the replacement of individual bodies or tube membrane modules 8" and therefore of individual tube membranes 6. Sintered metal pipes are particularly suitable for this purpose.

Figure 11:
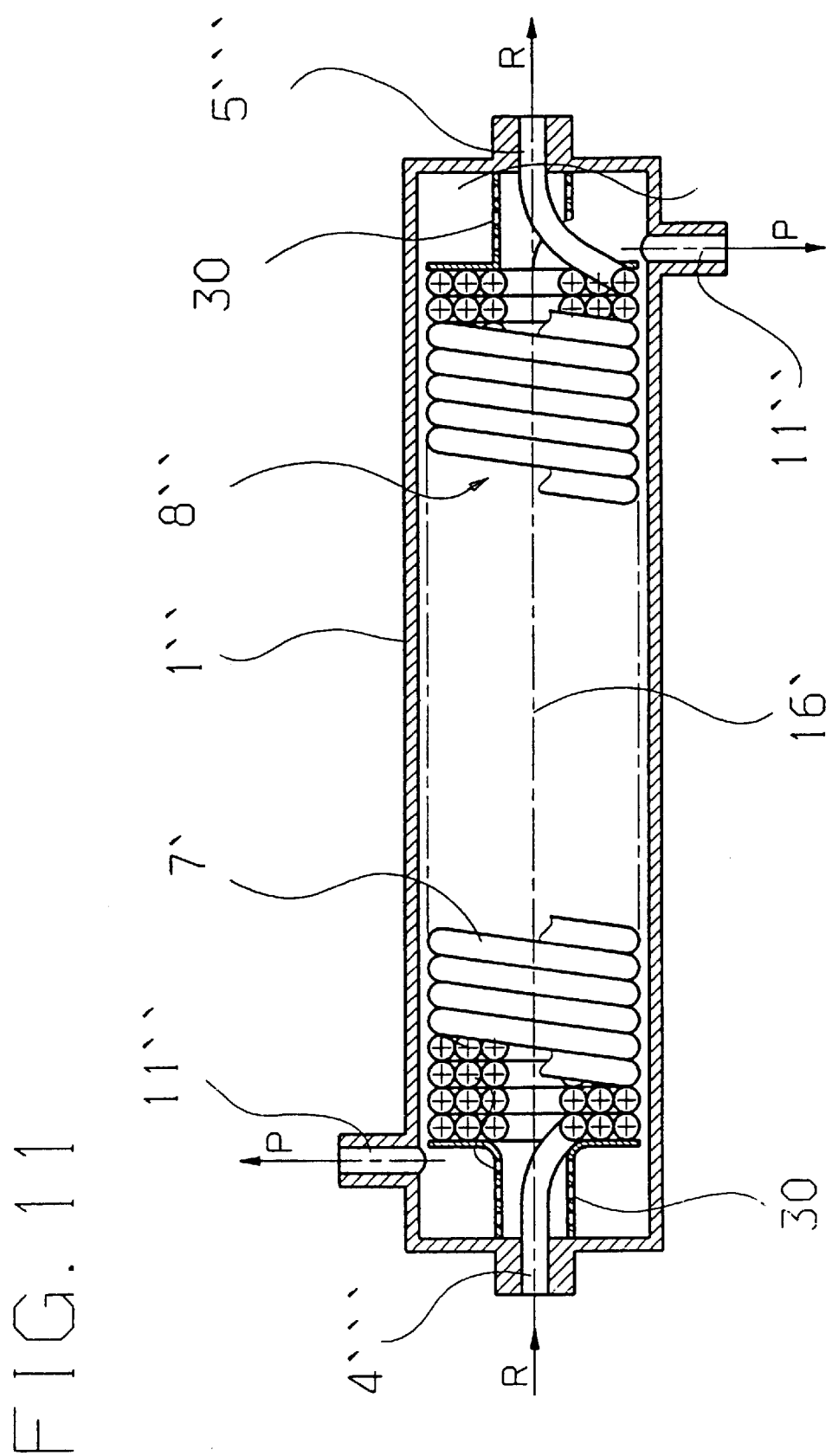

A membrane module in which the winding axis of the coiled tube membranes is horizontal, is shown in FIG. 11. This membrane module likewise comprises a closed vessel 1" having an inlet and an outlet 4"', and 5"' for the retentate and two outlets 11" for the permeate. The tube membrane is wound around a horizontal axis 16' either as a single tube or parallel in a plurality of tubes as bundle 7' connecting the inlets and outlets 4"' and 5"' for the retentate. The body 8" is kept in the vessel 1' via spacers 30 provided with apertures for the discharge of the permeate from the coil 8" towards the outlets 11".

With a view to repairing tube modules and to meet different requirements as to a filter surface area, an embodiment of the membrane module comprises at least two separate windings of tube membranes 6 in a vessel having separate inlets and outlets for the retentate. A winding pattern for such separate windings 8"' onto a combined winding core 9" with an axis 16" is illustrated in FIG. 12.

Figure 14:
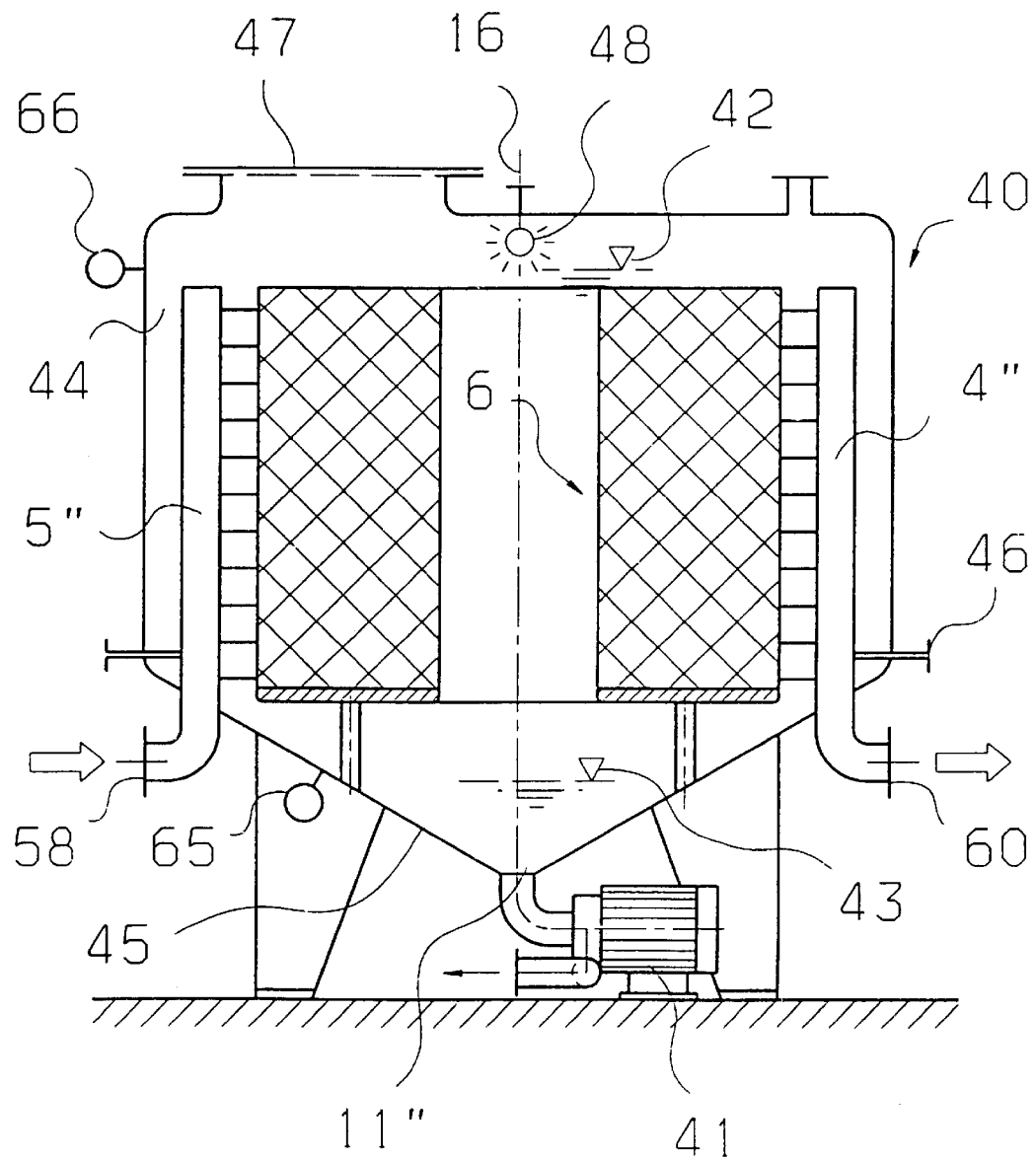

A variant of the membrane filtration module described in conjunction with FIG. 4a is shown in FIG. 14. In this embodiment as well, a plurality of coiled tube membrane units 6, not shown individually, are disposed in a container one above the other about a common axis 16. The tube membrane units 6 here are each wound, for instance as described in conjunction with FIG. 10a, such that its central portion forms two coaxial planar coils which communicate with one another at the inner edges of the coils and from the outer peripheries of their connector end portions extend to orifices into the collecting pipes or manifolds 5" and 4" for supplying and discharging the material mixture which is being separated. The collection tubes themselves, are diametrically opposite one another. While in the exemplary embodiment of FIG. 4a the catch vessel 1' for the permeate communicates with the permeate tank 18 only via an overflow with a venting valve 14', a vessel or container 40 for the tube membranes 6 of FIG. 14 acts simultaneously as a tank for the separated permeate.

The container or permeate tank 40 includes an opening or outlet 11"0 at the bottom for discharge of the permeate, which can be aspirated away by a pump 41 connected there. In operation of the separation system, as FIG. 15 shows, the permeate is advantageously pumped out of the permeate tank 40 down to a minimal level 43 only once it has reached a maximal level 42.

The container 40 includes a removable upper part 44, which is joined to a lower part 45 by a releasable flange 46. For maintenance work that does not require removal of the upper part 44 itself, this upper part has a closable manhole 47. Finally, a spray head 48 is provided on the top of the container 40 for cleaning the tube membranes 6.

Figure 15:
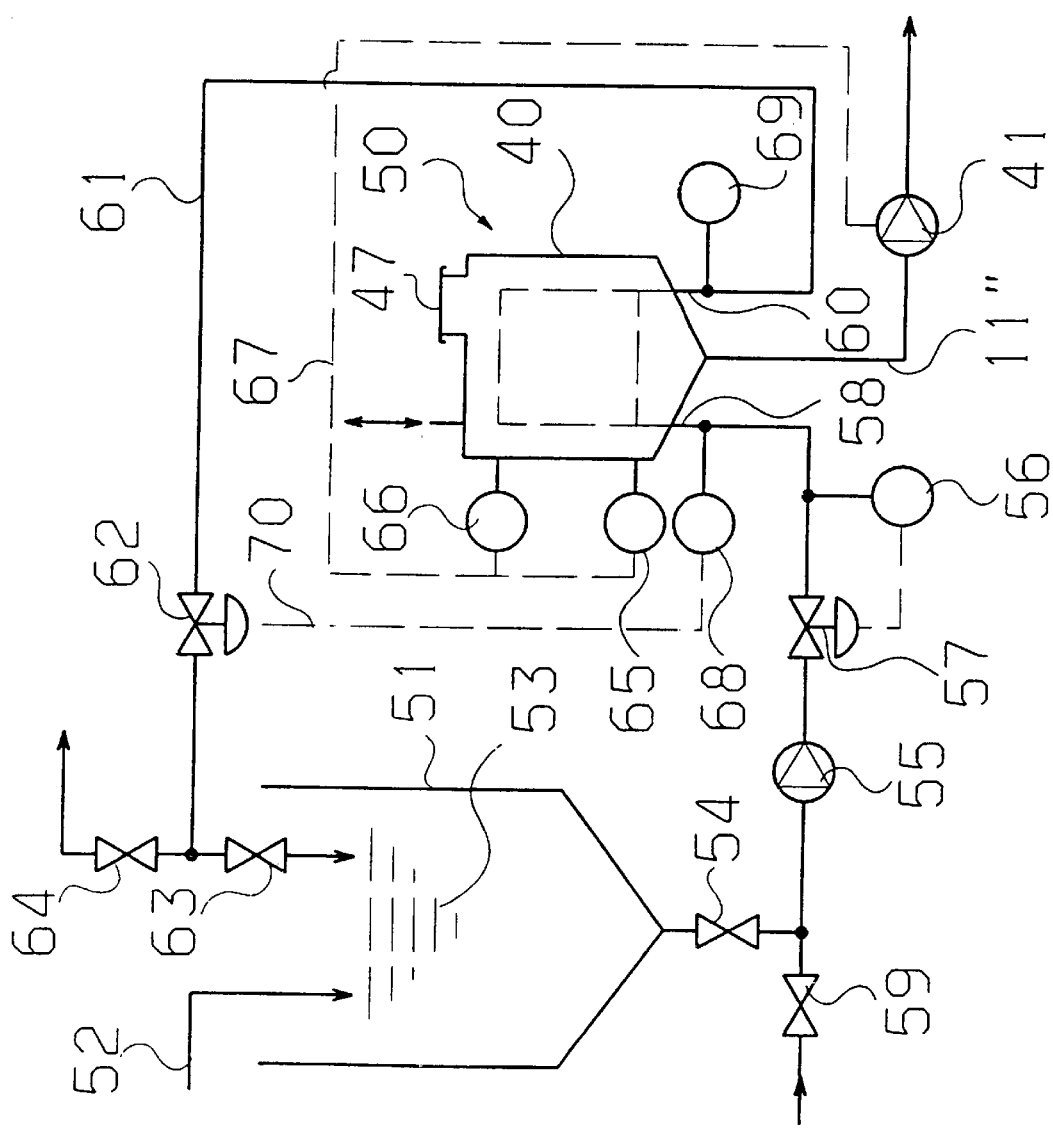

FIG. 15 is a diagram of a system for membrane separation that includes a membrane filtration module 50 according to the invention as shown in FIG. 14. This system also, in a manner known per se, includes a tank 51, which via a line 52 receives a material mixture 53 to be separated. Connected to the tank 51 at the bottom is an outlet valve 54 for the material mixture 53, which is delivered to a product inlet 58 of the membrane module 50 via a pump 55 and a regulating valve 57 controlled by pressure sensor 56. Along with the outlet valve 54, an inlet valve 59 for a rinsing fluid, which can be supplied to the membrane filtration module 50 instead of the material mixture 53, is provided.

The material mixture 53, as already described in conjunction with FIG. 14, flows through the membrane filtration module 50 and leaves it as retentate at an outlet 60. From the outlet 60, the retentate flows via a line 61 and a regulating valve 62 either back into the tank 51 via a valve 63, or leaves the system for membrane separation via a valve 64. The material mixture 53 accordingly circulates in a retentate loop in the course of separation operation in the system. As already described in conjunction with FIG. 14, the material separated off in the tube membranes 6 leaves the permeate tank 40 as permeate via the outlet 11" and is aspirated from the system via the connected pump 41.

The operation of the pump 41 is controlled by level sensors 65, 66 for the level of permeate in the permeate tank 40, via a control line 67, as already indicated with regard to FIG. 14. To measure the pressure of the material mixture 53, a respective pressure sensor 68, 69 is provided at the product inlet 58 and at the outlet 60. The pressure at the product inlet 58 is adjusted via the regulating valve 62, which receives a pressure report from the pressure sensor 68 via a control line 70.

Figure 16:
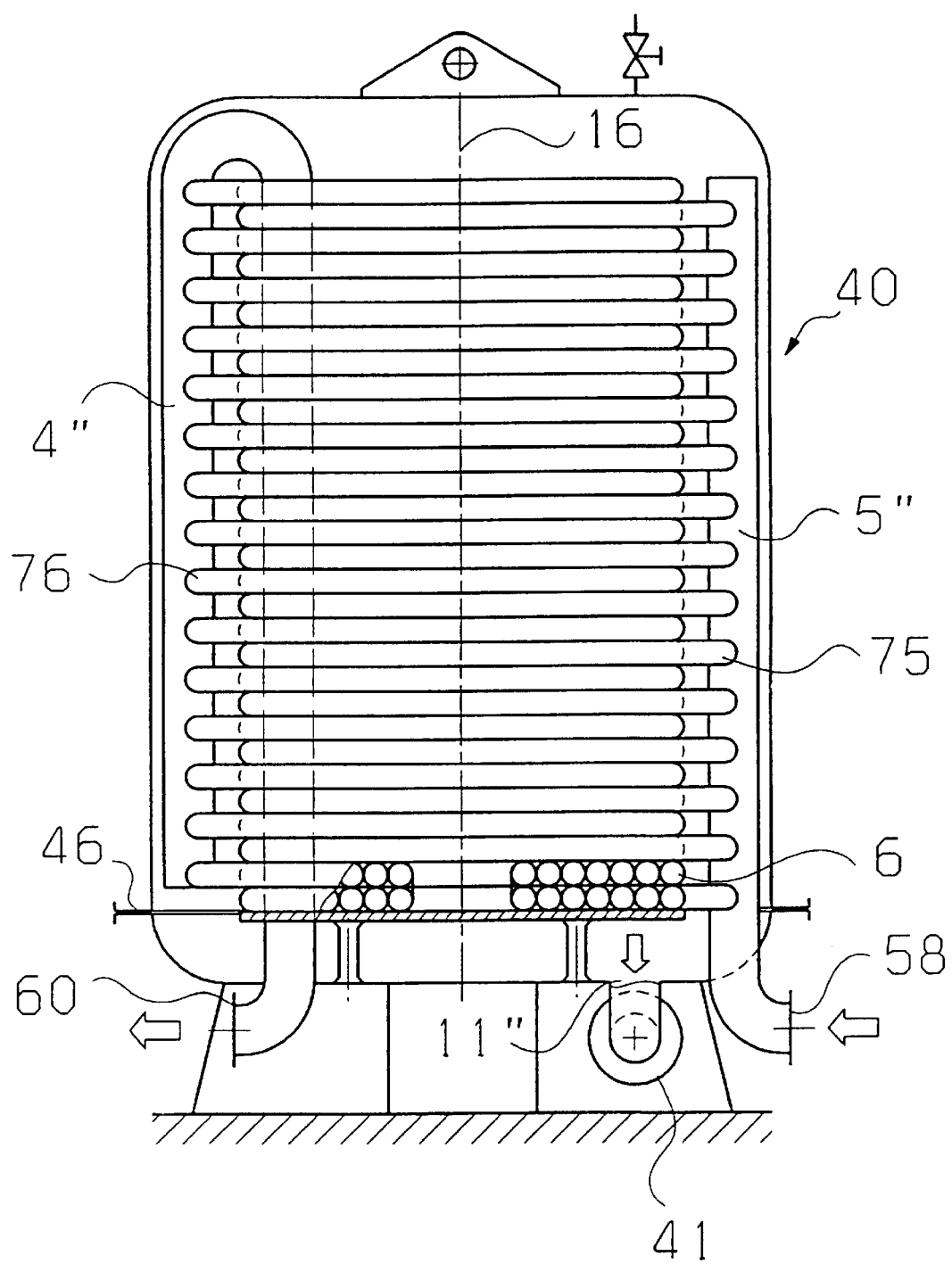

FIG. 16 shows a structural variant of the membrane filtration module of FIG. 14, in which the same reference numerals indicate corresponding components. FIG. 16 shows the disk like tube membrane units 6, disposed in a container 40 and arranged vertically one above the other about the common axis 16. The end portions 75, 76 of each of the tube membrane units 6 extend to the manifolds or collecting pipes 5" and 4" for the material mixture to be separated. An outlet opening 11" in the bottom of the container is provided for the discharge of permeate separated from the mixture flowing through the internal passages of the tube membranes 5 and collecting in the container.

Figure 17A:
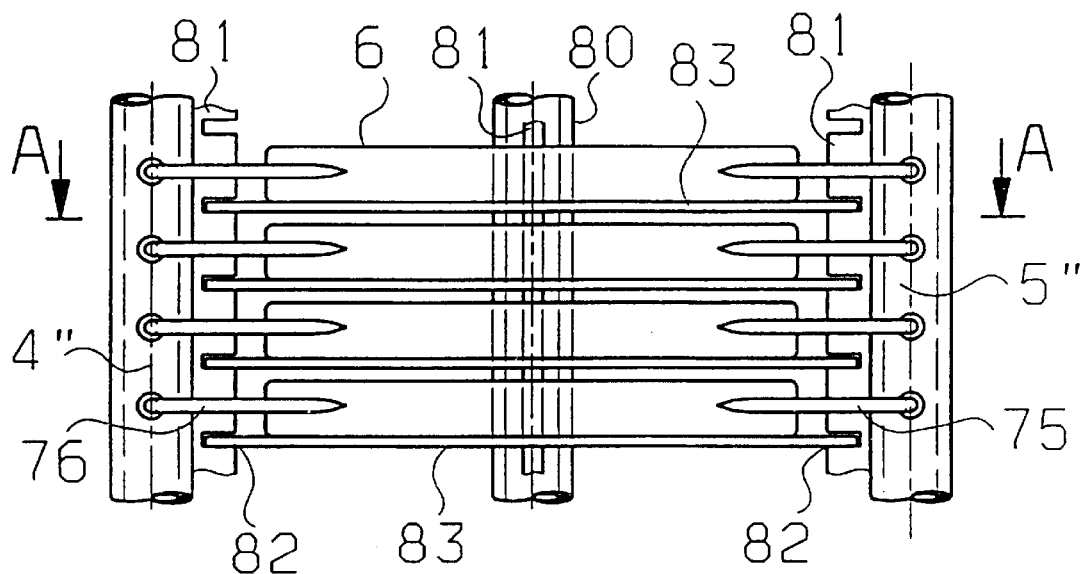
Figure 17B:
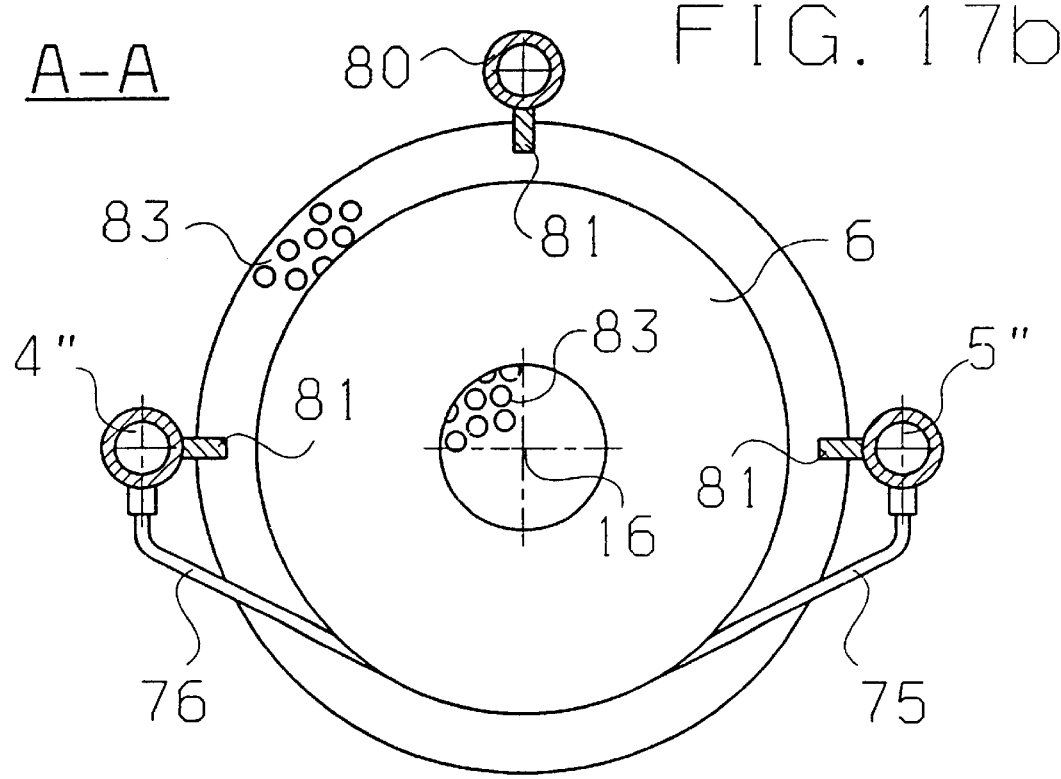

FIGS. 17a and 17b show an embodiment of a membrane module which allows coiled disklike tube modules 6 to be replaced by disconnection from the common collecting pipes or manifolds 4" and 5" of the kind described in conjunction with FIG. 16. FIG. 17b is a section crosswise to the axis 16 of the membrane module of FIG. 17a, taken along the line A—A. In addition to the manifolds or collecting pipes 4", 5" for the material mixture to be separated, a parallel support tube 80 is also provided. The tubes 4", 5", 80 all have a radially inward-pointing slotted strip 81, into the slots 82 of which perforated support plates 83 are thrust. In this way the support plates 83 form drawerlike compartments, in which the disklike tube membrane units 6 are interchangeably retained.

Figure 26B:
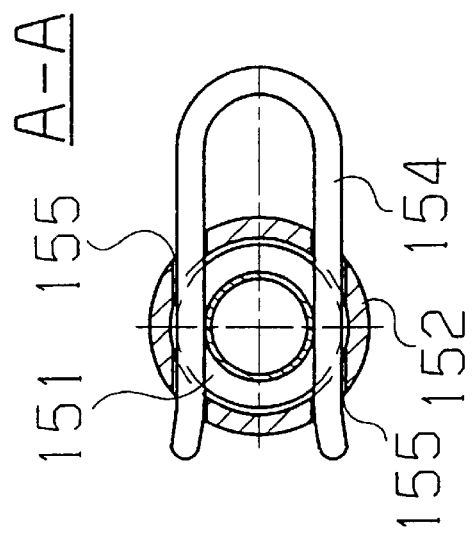
Figure 26A:
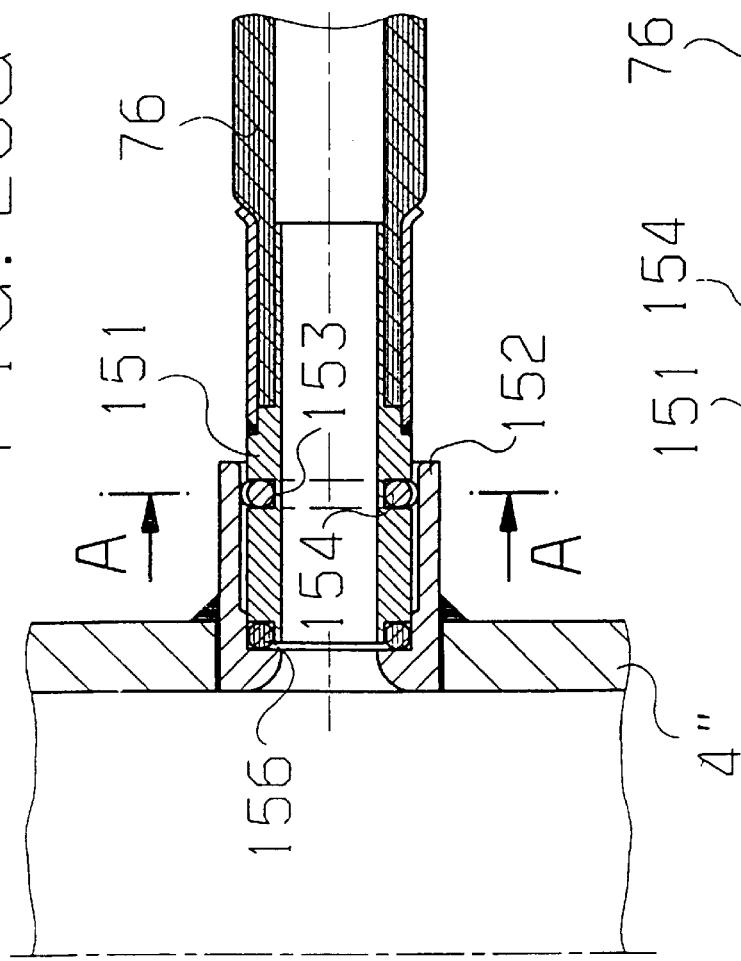
Figure 26C:
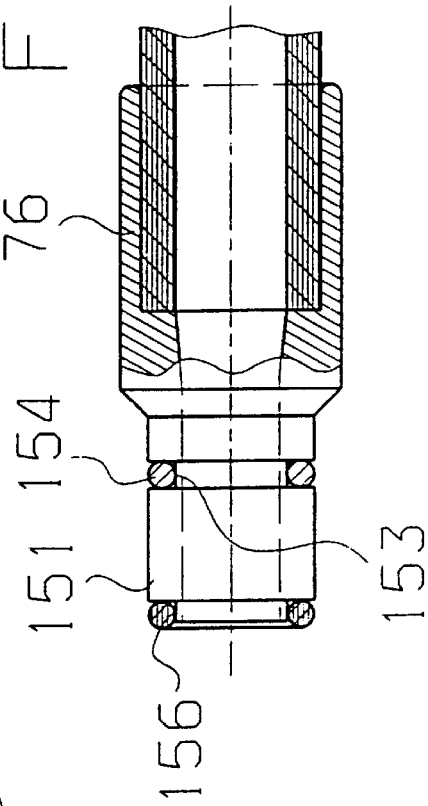

The end portions 75, 76 of the tube membrane units 6 for connection to the collecting pipes 5" and 4" are advantageously provided for replacement purposes with connector fittings for fast-action closure connections, as shown in detail in FIGS. 26a, 26b, 26c. The permeate emerging through the tube membranes 6 can easily flow out through the perforated support plates 83.

Figure 18:
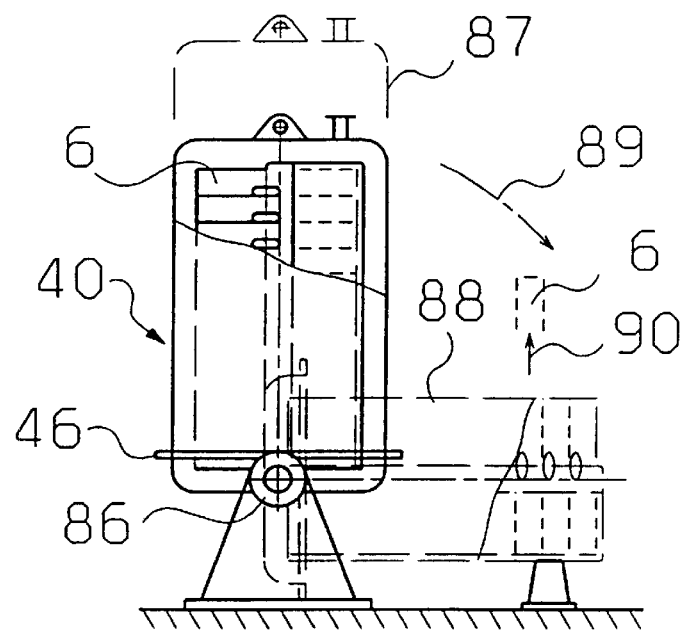

FIG. 18 schematically shows a further example of a membrane module with a plurality of tube membranes 6 and a permeate tank 40 of the type described in connection with FIG. 16. In this case, the permeate tank 40 is supported with a bearing 86 so it may pivot between a vertical position 87 and a horizontal position 88, as indicated by the arrow 89. In the horizontal position 88, replacement of individual membrane modules 6 can be done especially simply, as the arrow 90 indicates, while the vertical position 87 has advantages during operation of the system.

Figure 19:
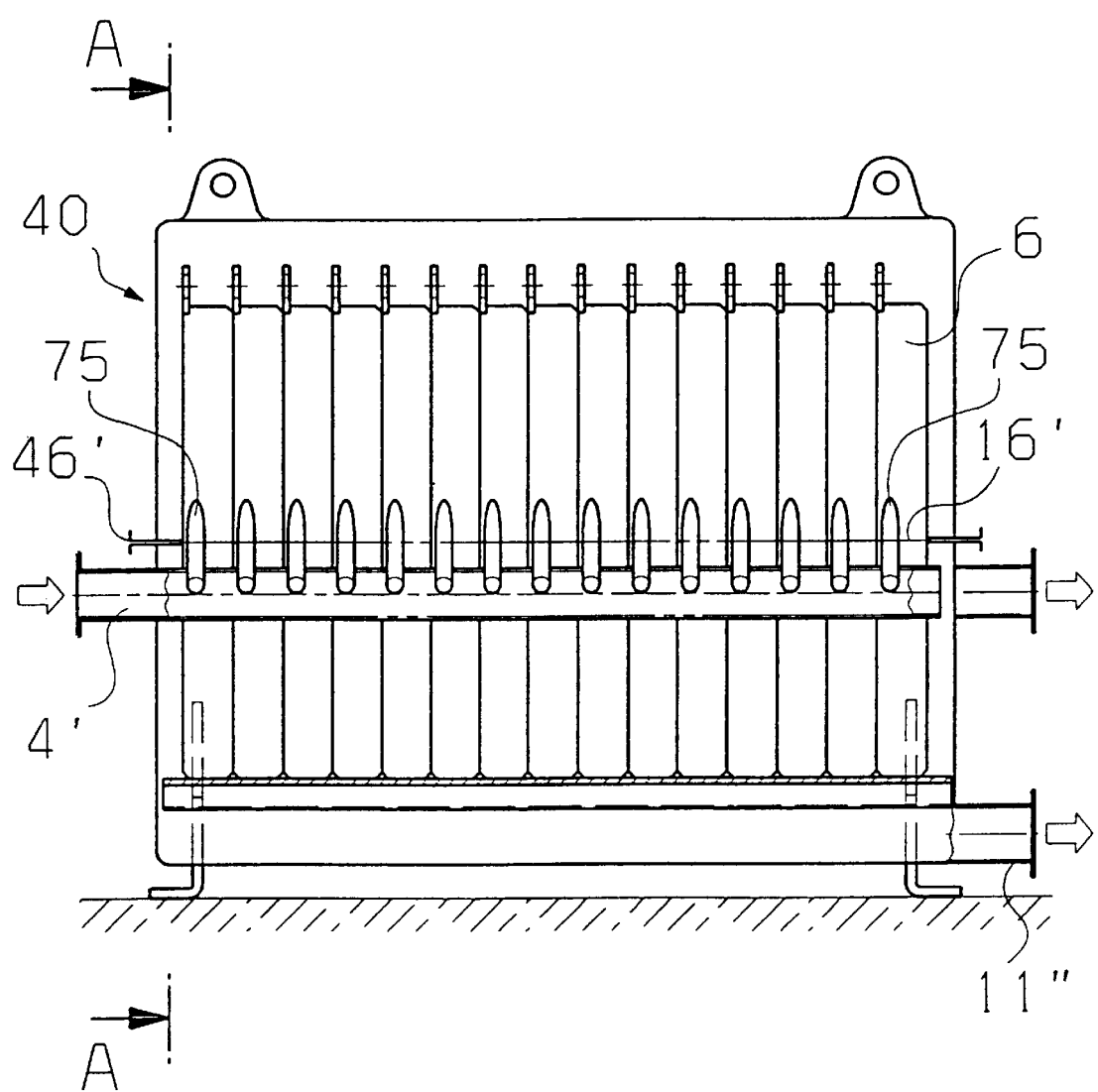

A membrane filtration module in which a plurality of disklike tube membrane units 6 are disposed in a container 40 side by side with a horizontal common axis 16' is shown in side view in FIG. 19 and in axial view in FIG. 20. The manifolds or collecting pipes 4', 5' for the material mixture to be separated are disposed diametrically and parallel to the common axis 16', as shown particularly in FIG. 20. An outlet 11" for the permeate is disposed at the bottom of the permeate tank 40. As FIG. 20 particularly shows, the permeate tank or container 40 has an upper part 44, which can be hinged open at a hinge 96 for servicing. The end portions of the tube membranes 6 for connection with the manifold or collecting pipe 4' are identified by reference numeral 75 in FIGS. 19, 20.

FIGS. 21a, 21b, 21c, for a membrane filtration module with horizontally arranged axes of the tube membranes 6, shows one possibility of horizontally retracting a removable part 44' of the permeate tank 40 through a rolling device 101, so that the tube membrane units 6 become accessible for servicing.

FIG. 22 shows an advantageous embodiment of a tube membrane 6 as a disklike flat winding, of the kind that can be used particularly in the membrane modules of FIGS. 16–21. The coiled central portion of the tube membrane 6 is disposed in a boxlike container 106, which serves the simultaneous purposes of retaining in position the windings of the two coils of the central portion of tube membrane 6 and providing access in the replacement of the coiled tube membrane 6. The end portion 75 and 76 of the tube membrane protrude circumferentially from the round boxlike container 106 as shown for coupling to the supply and discharge manifolds. The wall of the boxlike container 106, as FIG. 22 shows, is provided in some regions with many openings 107, which act to drain off the separated material as permeate. For work on the tube membrane 6 itself, a cap 108 can be removed from a lower part 109 of the container 106 by means of a snap closure 110.

Figure 23A:
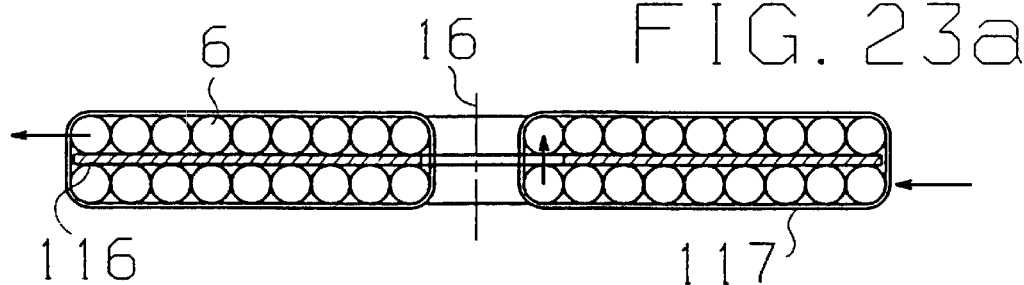
Figure 23B:
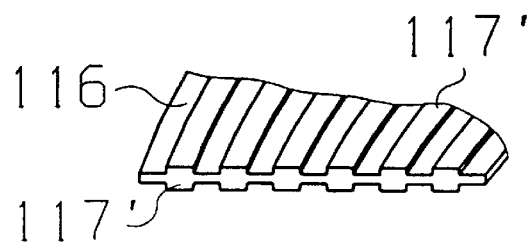
Figure 23C:
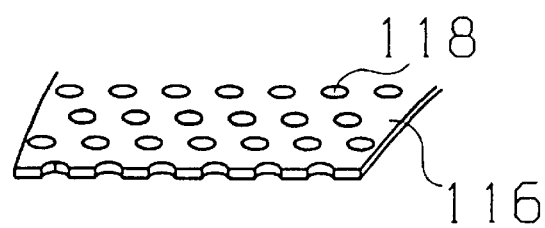

A further means for improving the stability of the coiled tube membrane is shown in FIG. 23a. Here, a likewise disklike support plate 116 is placed into the disklike tube membrane 6 having the axis 16. One of the two coils in the central portion of the elongated tube membrane lies on one face of the support plate 116, while the other coil lies on the opposite face of the plate 116. The ring assembly comprising the tube membrane 6 and the support plate 116 is retained by radially oriented holding straps, of which only the holding strap 117 is indicated in the sectional view of FIG. 23a. Better permeate drainage is permitted by variants of the support plate 116 as shown in FIG. 23b and FIG. 23c. The support plate 116 of FIG. 23b has ribs 117' on both sides, the spacings between which correspond to the spacing between adjacent windings of the tube membrane 6, such that the tube membrane 6 rests on the ribs 117', resulting in enlarged drainage conduits.

The support plate 116 of FIG. 23c has holes 118, which likewise make it easier for the permeate to drain off.

Figure 24:
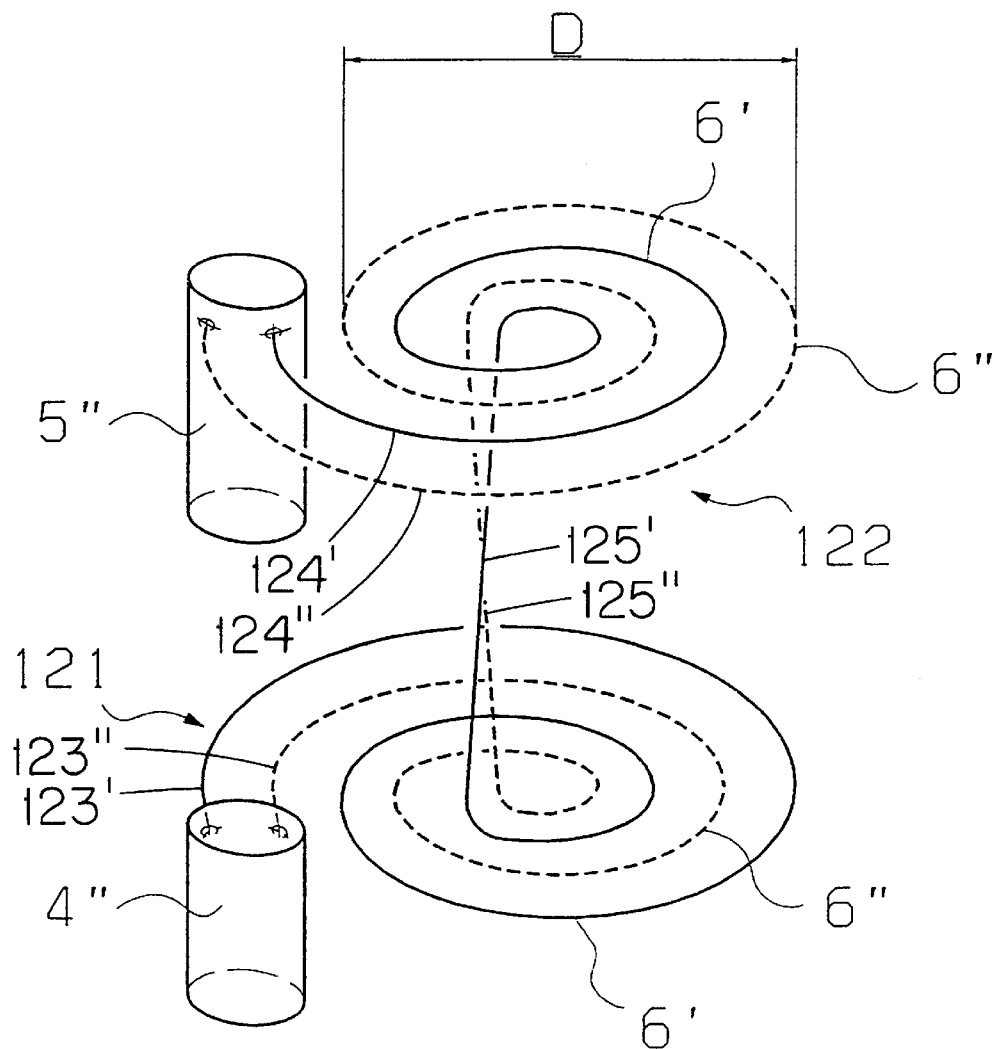

If, given a restricted length of the tube membranes in view of the pressure gradient, it is desired that a flat winding of only two axial layers with a large filter surface area be realized, then the winding can be formed of a plurality of radially side by side membrane tubes 6', 6". FIG. 24 schematically illustrates a suitable winding pattern for the incorporation of two tube membranes 6' and 6" into a two layer disklike body of enhanced diameter. In this diagram, first end portions 123' and 123" of the respective membrane tubing units 6' and 6" are shown as being coupled to a manifold 4" for supplying the mixture which is to be separated. Second end portions 124' and 124" of the respective tube membranes 6' and 6" are provided for coupling to a discharge manifold 5" for receiving the flow exiting the module. The central portions of the two tube membranes are wound together into each of two coils in layers 121 and 122, with connections 125' and 125" between the coils at their inner peripheries. Within each of the two radially extending coils, the two tube membranes 6' and 6" are disposed in the same radial plane. In order for there to be approximately equal-length terminal portions of the membrane tubes 6', 6" at the collecting pipes 4", 5", it is expedient that the radial order to membrane tubes 6', 6" in one layer 121 be reversed from the other layer 122 at the central transition in the winding diagram of FIG. 10b, as shown in FIG. 24. With this crossover, the succession of the parallel tube membranes in a radial direction from the central winding axis will be 6" followed by 6' in one of the planar coils (e.g., 121 in FIG. 24) and will be 6' followed by 6" in the other of the planar coils (e.g., 122 in FIG. 24). The thereby increased diameter D of the winding is no problem in many cases.

Figure 25:
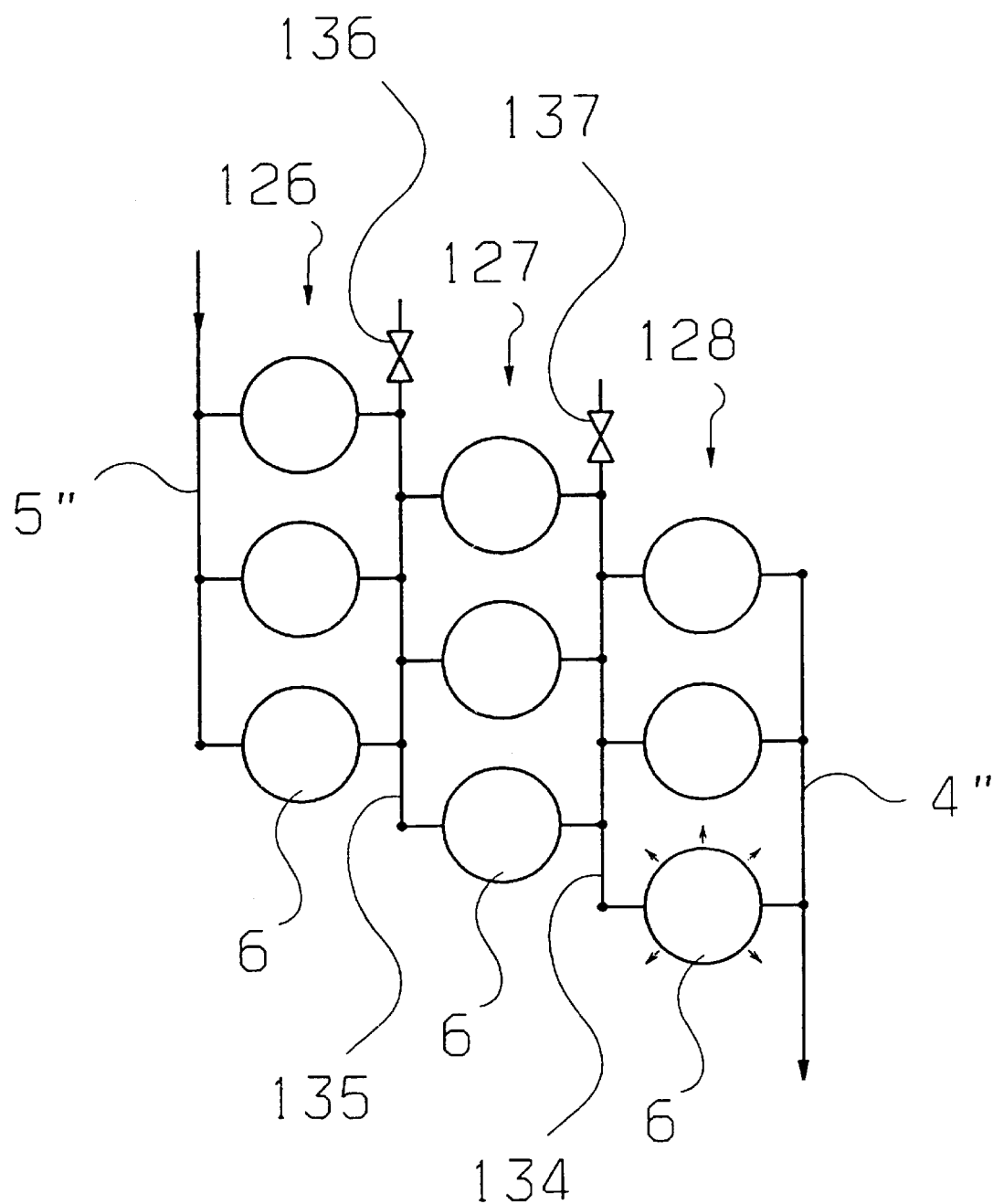

The collecting pipes described thus far for the material mixture to be separated have the function not only of collection or distribution but also a mixing function. In membrane tubes with an oncoming parallel flow, such a mixing function for certain tube lengths can serve to avert excessive thickening and hence clogging of the material mixture in individual membrane tubes. FIG. 25 schematically shows how mixing tubes in the form of collecting pipes 134, 135 are provided, one mixing tube per two groups, between groups 126, 127, 128 of tube membranes 6. These mixing tubes are closed toward the outside in the separation mode and have rinsing valves 136, 137 that are externally accessible only for cleaning purposes.

Figure 28:
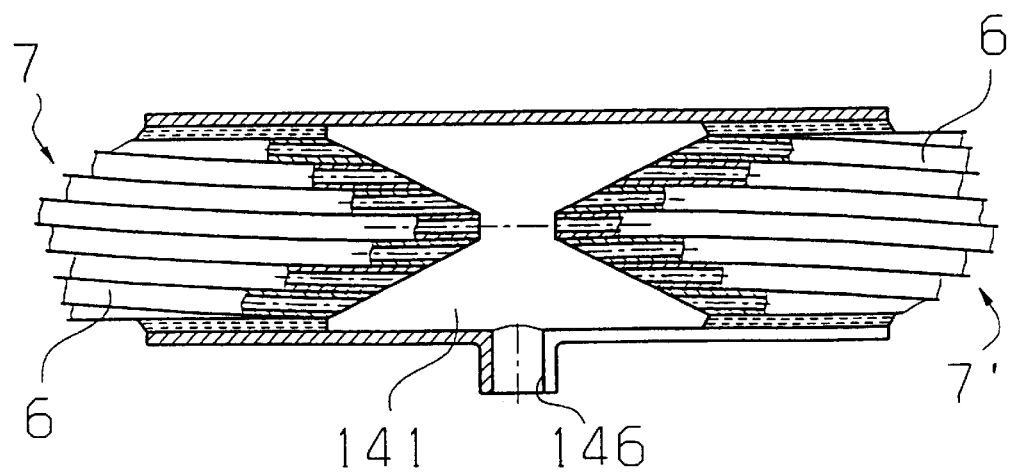

In membrane modules with bundles of tube membranes as in FIG. 1a, instead of the mixing tubes 136, 137 of FIG. 25, interruptions of the coiled bundle 7 that are embodied as mixing chambers 141 are provided, as shown in FIG. 28. The tube membranes 6 in the partial bundles 7, 7' located between the mixing chambers 141 all have the same length, but because of the coiling of the partial bundles their ends are staggered, as shown in FIG. 28. Connections 146 serve to deliver and drain off a rinsing agent for cleaning the tube membranes once a separation operation has ended. Like the bundles 7 coiled for instance as in FIG. 1a, the mixing chambers 141 are also located inside the vessel 1 for the separated material in the form of permeate; in the separation mode they are therefore surrounded on the outside by permeate, and the connections 146 for the rinsing agent discharge into connecting means, not shown, that lead through the permeate to the outside.

Figure 27:
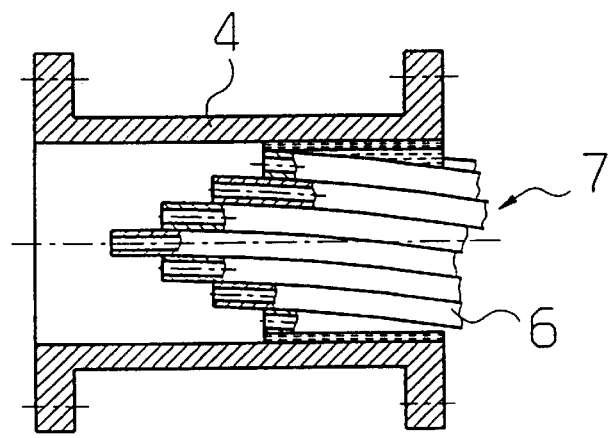

Like FIG. 28, FIG. 27 also shows a staggered arrangement, because of the coiling, of equal-length tube membranes 6 in a coiled bundle 7 inside a collecting pipe 4 as in FIG. 2a.

In conjunction with the embodiment of a membrane module in accordance with FIGS. 17a and 17b, which allows especially easy individual replacement of coiled tube membranes 6 by disconnection from the common collecting pipes 4" and 5", as explained in conjunction with FIG. 16, reference has already been made to advantageous fast-action closure connections of the tube membranes 6 to the collecting pipes 5" and 4". Such connections are shown in FIGS. 26a, 26b, 26c.

FIG. 26a shows an end portion 76 of a tube membrane 6 which is connected to a manifold or collecting pipe 4" shown in longitudinal section, with the interposition of a coupling comprising a connector fitting or transition piece 151 attached to the membrane tubing end and a receiving flange 152 on the manifold 4. As shown particularly by the cross section of FIG. 26b along a line A—A of FIG. 26a, the connector fitting 151 on the tubing end portion 76 has an external annular groove 153, which is engaged by a U-shaped clip 154. The clip 154 is inserted through bores 155 along secants in the receiving flange 152 and retained in such a way that the transition piece 151, after introduction into the receiving flange 152, is retained in rotatable but captive fashion. An O-ring 156 provided on the face end of the transition piece 151 assures a liquid-tight connection between the connection 76 of a tube membrane 6 and a collecting pipe 4". FIG. 26c shows a fragmentary section through a variant of the transition piece 151 of FIG. 26a, in which the same reference numerals indicate corresponding components.

Figure 13:
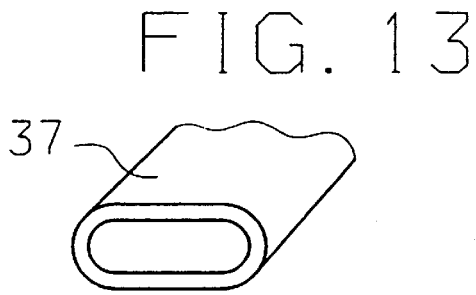
Figure 9:
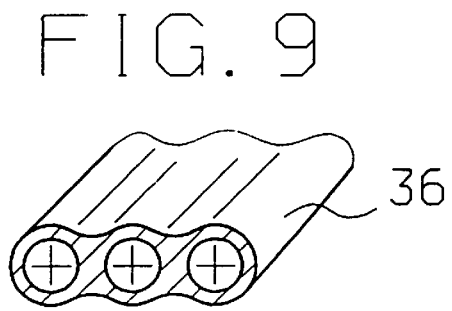

As already mentioned above, the described membrane modules can be manufactured with commercially available tube membranes permitting being bent at bending radii less than 20 times the inner tube diameter without damaging the membrane layer. Simpler than such bending processes may be a process for the manufacture of tube membranes by extrusion of synthetic resin using an extrusion nozzle having an annular aperture. Due to varying control of the flow-through velocity of the synthetic resin alongside the annular aperture the tube membrane may be manufactured in bent form by thermal or mechanical means. Using extrusion nozzles of suitable shapes multiple tube membranes 36 may also be extruded thus as a unit as shown in FIG. 9 or tube membranes 37 may be manufactured as a flat tube as apparent from FIG. 13. For the common collecting pipes for the parallel delivery and removal of the material mixture to be separated to and from the tube membranes, in particular collecting pipes 4", 5" in accordance with FIG. 14 with an oncoming flow at right angles to their axis, variants in which the collecting pipes have a plurality of separate parts, each with its own feed line, can offer advantages.

Membrane modules according to the invention can be used in cross current processes for the separation of fruit juices, foodstuff or waste waters. In this context, depending on the type of the component to be separated from the material mixture, one will select membranes with separation limits in the range applicable to reverse osmosis, nanofiltration, ultra filtration or micro filtration. For appropriate applications the membrane modules can also be simply adapted to function in an operation with dead-end filtration. In comparison with membrane modules with linear tube modules, according to the invention larger filter surface areas of about 180 m$^2$ can be attained in modules.

What is claimed is:

1. Membrane module of an installation for cross flow filtration of a mixture containing liquid material by flowing said mixture over membrane surfaces disposed between supply conduit means and discharge conduit means comprising a plurality of tube membranes adapted for connection between said supply conduit means and said discharge conduit means and having internal flow passages of substantially equal inside diameters measuring at least a plurality of millimeters for receiving a flow in parallel therethrough of streams of said mixture, each of said plurality of tube membranes being curved along its length to form a coil and said coils being disposed in coaxial relation to each other.

2. Membrane module according to claim 1, characterized in that a plurality of tube membranes is provided in the membrane module lined up side by side and wound parallel to one another.

3. Membrane module according to claim 2, wherein each of said conduit means extends longitudinally in the direction of its central axis and in that end portions of the tube membranes extend into each of the conduit means in a direction generally transverse to the central axis of that conduit means.

4. Membrane module according to claim 1, wherein a closed vessel having a housing wall is provided for enclosing the coiled tube membranes and for receiving a separated material, and wherein said supply and discharge conduit means for the material mixture to be separated are passed outside through said housing wall of the vessel and wherein an opening is provided in said vessel for the passage therethrough of the separated material.

5. Membrane module according to claim 4, wherein at least two separate coils are provided in said vessel.

6. Membrane module according to claim 5, wherein the tube membranes are of equal length in all of said separate coils.

7. Membrane module according to claim 5, wherein the lengths of the tube membranes are different for at least two separate coils and wherein the collection tubes of the separate coils exiting from the vessel are adapted to be switched off individually from outside.

8. Membrane module according to claim 4, wherein said opening for the separated material exits from an upper part of the vessel.

9. Membrane module according to claim 4, characterized in that the axis (16) about which the tube membranes (6) are coiled is disposed vertically in the vessel (1').

10. Membrane module according to claim 9, wherein the conduit means for the material mixture to be separated exit from said vessel through the lower region of the vessel (1), and in that the vessel (1) comprises a bottom section (2) and a removable cover (3) adapted to be removed from said bottom section.

11. Membrane module according to claim 4, wherein said supply and discharge conduit means, for at least part of their lengths, are located inside the closed vessel.

12. Membrane module according to claim 4, wherein the vessel comprises at its bottom an outlet for the separated material.

13. Membrane module according to claim 4, wherein the closed vessel comprises a viewing glass for the separated material.

14. Membrane module according to claim 1, wherein the shape of the coiled tube membranes is stabilized by means of holding straps.

15. Membrane module according to claim 1, wherein the tube membranes comprise spacer elements on their exterior surfaces.

16. Membrane module according to claim 15, wherein the spacer elements are wire-like elements, wound around the tube membranes.

17. Membrane module according to claim 1, wherein at least one winding comprising only a single continuous tube membrane is in the coiled form as a disklike flat winding having only one layer axially to the winding axis, and one of the conduit means is disposed on the inside near the winding axis, and the other conduit means is disposed near the outer circumference of the flat winding.

18. Membrane module according to claim 1, wherein the tube membranes are removably connected to said conduit means.

19. Membrane module according to claim 1, wherein said plurality of tube membranes form a coiled body which comprises a plurality of longitudinally contiguous, parallel tube membranes wound as a unit.

20. Membrane module according to claim 1, wherein the tube membranes each have an inside diameter of more than about 6 mm and together have an effective filtration surface area of at least 20 m$^2$ and are disposed jointly inside a closed vessel which serves as a tank for a separated-off material, through the wall of which tank the conduit means for the material mixture to be separated are extended, and whose wall has an opening for the separated-off material.

21. Membrane module according to claim 1, wherein the tube membranes (6) are arranged in a plurality of groups (126–128) with collecting pipes (4", 5", 134, 135) for supplying and draining off a material mixture to be separated, and for at least two groups (126, 127), the collecting pipe (135) for drainage from the one group (126) supplies retentate to the other group (127), and this collecting pipe (135) is embodied as a mixing chamber for the material mixtures in the tube membranes (6) of the two groups (126, 127).

22. Membrane module according to claim 21, wherein the at least two groups of coiled tube membranes have axes that are located radially side by side.

23. A process of using the membrane module according to claim 1, in cross flow filtration of fruit juices.

24. Membrane module of an installation for membrane separation of a mixture of materials comprising a plurality of tube membranes having inside diameters measuring at least a plurality of millimeters for receiving a flow therethrough of a mixture of materials to be separated, said plurality of tube membranes (6) being twisted together in a bundle of ropelike configuration, and said twisted bundle being curved along its length to form a coil and terminating at one end of the coil in a first collection tube for conveying the material mixture to be separated into all of said membrane tubes in parallel and terminating at the opposite end of the coil in a second collection tube for discharging in parallel the material mixture exiting from all of said membrane tubes.

25. Membrane module according to claim 24, wherein all of said tube membranes in said bundle are of equal length.

26. Membrane module according to claim 24, wherein each of said collecting tubes extends longitudinally in the direction of its central axis and end portions of the tube membranes extend into each of the common collecting tubes in a direction generally parallel to the central axis of that collecting tube.

27. Membrane module according to claim 24, including a vessel for enclosing said tube membranes, and wherein a pipe duct for the separated material is provided and serves as a collecting tube for separated material inside the vessel and as a winding core for the coiled tube membranes.

28. Membrane module according to claim 24, wherein the tube membranes are cast into the collecting tubes.

29. Membrane module of an installation for membrane separation of a mixture of materials comprising a plurality of tube membranes having inside diameters measuring at least a plurality of millimeters for receiving a flow therethrough of a mixture of materials to be separated, each of said plurality of tube membranes being a single continuous tube membrane wound into a coiled body which comprises, axially to the winding axis, only two layers in the form of a disklike flat winding.

30. Membrane module according to claim 29, including a horizontally extending closed vessel and wherein the coiled tube membranes are disposed with their winding axes extending horizontally.

31. Membrane module according to claim 30, wherein said horizontally extending closed vessel has the form of half of a circular cylinder at the bottom and at the top includes a removable closure cap for covering an opening of the vessel whose outline matches the outline of the vessel.

32. Membrane module according to claim 30, wherein the coiled tube membranes can be replaced individually by disconnection from supply and discharge conduit means for the mixture of materials to be separated.

33. Membrane module according to claim 32, wherein the coiled tube membranes are separably secured to the common collecting pipes by fast-action closure connections.

34. Membrane module according to claim 29, wherein at least one tube membrane is disposed in a boxlike container, whose wall is provided in at least some regions with openings for drainage of a separated-off material.

35. Membrane module according to claim 29, wherein at least one coiled tube membrane is provided with a support plate, which extends radially across the winding.

36. Membrane module according to claim 29, including supply and discharge conduit means for the material to be separated, and wherein the axes of the coiled tube membranes and the axes of conduit means are parallel; wherein the tube membranes can be individually replaced by disconnection from the conduit means; and wherein spaced apart support plates form drawerlike compartments for retaining the tube membranes.

37. Membrane module according to claim 36, wherein the support plates are retained in slotted strips which extend along the supply and discharge conduit means or along supports parallel to the supply and discharge conduit means and are supported thereby, and wherein the support plates have perforated disklike openings for the drainage of a separated-off material.

38. Membrane module according to claim 29, including a group of continuous, radially side by side tube membranes (6', 6") of equal length coiled as a disklike flat winding having only two layers (121, 122) axially to the winding axis, with the radial order of tube membranes (6', 6") in the group in one layer (121) being the reverse of that in the other layer (122).

39. Membrane module of an installation for membrane separation of a mixture of materials comprising a plurality of tube membranes having inside diameters measuring at least a plurality of millimeters for receiving a flow therethrough of a mixture of materials to be separated, each of said plurality of tube membranes being curved along its length to form a coil and terminating at the beginning and at the end of the coil in a single joint collecting tube for parallel conveyance and discharge of the material mixture to be separated, and wherein a closed tank having a housing wall is provided for enclosing the coiled tube membranes and for receiving a separated material, the collecting tubes for the material mixture to be separated, as well as at least one pipe duct for a separated material are passed outside through said housing wall of the tank, and the opening for the separated-off material is disposed at the bottom in the wall of the tank, and level sensors for the separated-off material are mounted at various heights along the tank.

40. Membrane module of an installation for membrane separation of a mixture of materials comprising a plurality of tube membranes having inside diameters measuring at least a plurality of millimeters for receiving a flow therethrough of a mixture of materials to be separated, each of said plurality of tube membranes being curved along its length to form a coil and terminating at the beginning and at the end of the coil in a single joint collecting tube for parallel conveyance and discharge of the material mixture to be separated, and wherein the tube membranes are coiled in the form of at least one bundle (7) of a plurality of tube membranes (6) in the membrane module, and that the bundle comprises at least two portions (7, 7'), which by connecting means communicate in a manner sealed off tightly from the outside of the bundle and with an interstice (141), the interstice being embodied as a mixing chamber (141) for the material mixtures in the tube membranes (6) of the two portions (7, 7').

41. Membrane module according to one of claims 21 or 40, embodied such that in operation of the a system for membrane separation, mixing chambers (134, 135, 141) for material mixtures to be separated are provided and are surrounded on the outside by a material separated off by the tube membranes (6).

42. Membrane module according to claim 41, wherein at least one mixing chamber (134, 135, 141) has a connection (146) with a connecting means for a rinsing means for the tube membranes (6), and the connecting means passes through the separated-off material and is supplied from outside.

43. Membrane module of an installation for membrane separation of a mixture of materials comprising a plurality of tube membranes having inside diameters measuring at least a plurality of millimeters for receiving a flow therethrough of a mixture of materials to be separated; wherein the tube membranes (6) are disposed in a coil in the membrane module, each of a plurality of tube membranes (6) terminates at the beginning and at the end of the coil in a single common collecting tube (4", 5") for parallel conveyance and discharge of the material mixture to be separated, and wherein a closed vessel (40) having a housing wall is provided for enclosing the coiled tube membranes (6) and for receiving a separated material, the collecting tubes (4", 5") for the material mixture to be separated, as well as at least one pipe duct (11") for a separated material are passed outside through said housing wall of the vessel; and wherein the tube membranes (6) can be back-flushed, and means are provided by which the closed vessel (40) for the separated-off material can intermittently be placed at overpressure.

44. A disc-like tube membrane module for use in a cross flow filtration apparatus in which a mixture to be filtered is flowed over membrane surfaces, said tube membrane module comprising
at least one membrane tubing unit providing an elongated internal passage extending therethrough for receiving the flow of the mixture to be filtered, said membrane tubing unit having first and second end portions and a central portion extending between said end portions,
said central portion being wound into a disc comprising a plurality of side-by-side coaxial planar coils extending radially with respect to the winding axis of the coils,
said first end portion of said membrane tubing unit extending from the outer periphery of one of said coils for connection to means for supplying the flow of said mixture to said internal passage, and
said second end portion of said membrane tubing unit extending from the outer periphery of another of said coils for connection to means for receiving the flow of the mixture from the opposite end of said internal passage.

45. A disc-like tube membrane module according to claim 44, wherein the diameter of said internal passage is at least a plurality of millimeters.

46. A disc-like tube membrane module according to claim 44, wherein said disc comprises two side-by-side coaxial planar coils.

47. A disc-like tube membrane module according to claim 44, wherein said at least one membrane tubing unit is a length of a polymeric tube membrane.

48. A disc-like tube membrane module according to claim 47, wherein said length of tube membrane is polypropylene.

49. A disc-like tube membrane module according to claim 44, additionally comprising a connector fitting on each of said tubing unit end portions.

50. A disc-like tube membrane module according to claim 49, wherein said connector fitting is a component of a fast-action coupling.

51. A disc-like tube membrane module according to claim 44, additionally comprising means for stabilizing said disc.

52. A disc-like tube membrane module according to claim 51, including a support plate for said coils.

53. A disc-like tube membrane module according to claim 52, wherein said support plate is located between two coils of said disc.

54. A disc-like tube membrane module according to claim 51, including a holding strap.

55. A disc-like tube membrane module according to claim 54, including a plurality of radially extending holding straps extending from a central opening in said disc to the periphery of said disc in surrounding relation to said side-by-side coils.

56. A disc-like tube membrane module according to claim 44, additionally comprising a box like enclosure for the coils of said disc, said enclosure having openings therein for the passage of permeate out of said enclosure and having openings through which said first and second end portions pass to the exterior of said enclosure.

57. A disc-like tube membrane module according to claim 44, wherein said first end portion of said membrane tubing unit extends from a first of said coils in one circumferential direction and said second end portion of said membrane tubing unit extends from a second of said coils in the opposite circumferential direction.

58. A disc-like tube membrane module according to claim 44, including a plurality of said membrane tubing units.

59. A disc-like tube membrane module according to claim 58, wherein the central portions of all of said plurality of membrane tubing units extend in parallel radially in each of said side-by-side planar coils.

60. A disc-like tube membrane module according to claim 59, wherein all of said tubing units have substantially the same internal passage cross section and length to provide substantially equal resistances to flow therethrough of the mixture to be filtered.

61. A disc-like tube membrane module according to claim 59, wherein the succession in a radial direction of the parallel extending membrane tubing units in a first planar coil is reversed with respect to the succession of said tubing units in a second planar coil.

62. A cross flow filtration module for filtration apparatus in which a mixture to be separated is flowed over membrane surfaces, said cross flow filtration module comprising a container;

a supply manifold positioned at least partly within said container to supply the flow of said mixture;

a plurality of disc-like tube membrane units positioned within said container for separating permeate from said mixture;

each of said tube membrane units including at least one tube membrane having a first end portion, a second end portion, and a central portion wound into a disc comprising a plurality of coaxial planar coils with said first end portion extending peripherally from one of said coils and said second end portion extending peripherally from another of said coils;

a discharge manifold positioned at least partly within said container to discharge the flow of said mixture after the separation of permeate therefrom;

an opening in said container through which permeate discharges from said container; and said first end portion of each of said tube membrane units being coupled to said supply manifold and said second end portion of each of said tube membrane units being coupled to said discharge manifold.

63. A cross flow filtration module according to claim 62, wherein said disc comprises two side-by-side coils.

64. A cross flow filtration module according to claim 62, wherein said supply manifold contains an elongated passage through which the mixture flows longitudinally, and wherein said first end portions of said tube membrane units communicate with such elongated passage in transverse directions.

65. A cross flow filtration module according to claim 62, wherein said end portions of said tubing units are connected with said manifolds by fast-action couplings.

66. A cross flow filtration module according to claim 62, wherein said plurality of disc-like tube membrane units have a common substantially horizontal axis.

67. A cross flow filtration module according to claim 66, wherein said plurality of disc-like tube membrane units are removably positioned on support surfaces in said container.

68. A cross flow filtration module according to claim 67, wherein said manifolds have substantially horizontal axes extending generally parallel to said common axis of said tube membrane units.

69. A cross flow filtration module according to claim 68, wherein said container has a movable top portion for permitting access to said tube membrane units and said manifolds.

70. A cross flow filtration module according to claim 62, wherein said plurality of disc-like tube membrane units have a common substantially vertical axis.

71. A cross flow filtration module according to claim 70, wherein said manifolds extend generally parallel to said substantially vertical axis at locations spaced from said coils.

72. A cross flow filtration module according to claim 70, including a plurality of support plates mounted in said container at different horizontal levels and wherein at least one of said tube membrane units is removably disposed on and supported by each of said support plates.

73. A cross flow filtration module according to claim 72 wherein said end portions of each of said tube membrane units are releasably coupled to said manifolds.

74. A cross flow filtration module according to claim 62, wherein said supply manifold is elongated; wherein said plurality of disc-like tube membrane units have a common axis extending substantially parallel to said supply manifold; and wherein said discharge manifold is elongated and extends substantially parallel to said plurality of membrane units.

* * * * *